(12) United States Patent
Vahdat

(10) Patent No.: US 11,531,852 B2
(45) Date of Patent: Dec. 20, 2022

(54) MACHINE LEARNING SYSTEMS AND METHODS FOR TRAINING WITH NOISY LABELS

(71) Applicant: D-Wave Systems Inc., Burnaby (CA)

(72) Inventor: Arash Vahdat, Coquitlam (CA)

(73) Assignee: D-WAVE SYSTEMS INC., Burnaby (CA)

( * ) Notice: Subject to any disclaimer, the term of this patent is extended or adjusted under 35 U.S.C. 154(b) by 927 days.

(21) Appl. No.: 15/822,884

(22) Filed: Nov. 27, 2017

(65) Prior Publication Data

US 2018/0150728 A1    May 31, 2018

Related U.S. Application Data

(60) Provisional application No. 62/427,020, filed on Nov. 28, 2016, provisional application No. 62/508,343, filed on May 18, 2017.

(51) Int. Cl.
*G06K 9/62*       (2022.01)
*G06N 3/04*       (2006.01)
(Continued)

(52) U.S. Cl.
CPC ......... *G06K 9/6278* (2013.01); *G06K 9/6232* (2013.01); *G06K 9/6256* (2013.01);
(Continued)

(58) Field of Classification Search
CPC .. G06K 9/6278; G06K 9/6232; G06K 9/6256; G06N 3/0427; G06N 3/0454;
(Continued)

(56) References Cited

U.S. PATENT DOCUMENTS 5,249,122 A    9/1993    Stritzke
6,671,661 B1   12/2003   Bishop
(Continued)

FOREIGN PATENT DOCUMENTS

CN    101657827 A    2/2010
CN    102364497 A    2/2012
(Continued)

OTHER PUBLICATIONS

Azadi et al., "Auxiliary Image Regularization For Deep CNNs With Noisy Labels", Mar. 2, 2016, ICLR (Year: 2016).*
(Continued)

*Primary Examiner* — Miranda M Huang
*Assistant Examiner* — Chase P. Hinckley
(74) *Attorney, Agent, or Firm* — Cozen O'Connor

(57) ABSTRACT

Machine learning classification models which are robust against label noise are provided. Noise may be modelled explicitly by modelling "label flips", where incorrect binary labels are "flipped" relative to their ground truth value. Distributions of label flips may be modelled as prior and posterior distributions in a flexible architecture for machine learning systems. An arbitrary classification model may be provided within the system. The classification model is made more robust to label noise by operation of the prior and posterior distributions. Particular prior and approximating posterior distributions are disclosed.

19 Claims, 4 Drawing Sheets

(51) Int. Cl.
  *G06N 5/04* (2006.01)
  *G06N 3/08* (2006.01)
  *G06N 7/00* (2006.01)

(52) U.S. Cl.
  CPC ......... *G06N 3/0427* (2013.01); *G06N 3/0454* (2013.01); *G06N 3/0472* (2013.01); *G06N 3/08* (2013.01); *G06N 5/04* (2013.01); *G06N 7/005* (2013.01)

(58) Field of Classification Search
  CPC .......... G06N 3/0472; G06N 3/08; G06N 5/04; G06N 7/005; G06N 20/00; G06N 20/10; G06N 20/20
  See application file for complete search history.

(56) References Cited

U.S. PATENT DOCUMENTS

| | | |
|---|---|---|
| 7,493,252 B1 | 2/2009 | Nagano et al. |
| 8,073,808 B2 | 12/2011 | Rose |
| 8,244,650 B2 | 8/2012 | Rose |
| 8,340,439 B2 | 12/2012 | Mitarai et al. |
| 8,548,828 B1 | 10/2013 | Longmire |
| 8,863,044 B1 | 10/2014 | Casati et al. |
| 9,378,733 B1 | 6/2016 | Vanhoucke et al. |
| 9,727,824 B2 | 8/2017 | Rose et al. |
| 10,296,846 B2* | 5/2019 | Csurka .................. G06N 3/0454 |
| 10,318,881 B2 | 6/2019 | Rose et al. |
| 11,157,817 B2* | 10/2021 | Rolfe .................... G06N 3/0445 |
| 2002/0010691 A1* | 1/2002 | Chen .................... G06K 9/6278 706/20 |
| 2002/0077756 A1 | 6/2002 | Arouh et al. |
| 2003/0030575 A1 | 2/2003 | Frachtenberg et al. |
| 2005/0119829 A1 | 6/2005 | Bishop et al. |
| 2006/0115145 A1* | 6/2006 | Bishop .................. G06K 9/6296 382/155 |
| 2007/0162406 A1 | 7/2007 | Lanckriet |
| 2008/0069438 A1 | 3/2008 | Winn et al. |
| 2008/0103996 A1 | 5/2008 | Forman et al. |
| 2008/0132281 A1 | 6/2008 | Kim et al. |
| 2008/0312663 A1 | 12/2008 | Haimerl et al. |
| 2009/0171956 A1 | 7/2009 | Gupta et al. |
| 2010/0010657 A1 | 1/2010 | Do et al. |
| 2010/0185422 A1 | 7/2010 | Hoversten |
| 2010/0332423 A1* | 12/2010 | Kapoor .................. G06N 5/045 706/12 |
| 2011/0044524 A1 | 2/2011 | Wang et al. |
| 2011/0142335 A1 | 6/2011 | Ghanem et al. |
| 2012/0084235 A1 | 4/2012 | Suzuki et al. |
| 2013/0071837 A1* | 3/2013 | Winters-Hilt ........ C12Q 1/6869 382/155 |
| 2013/0097103 A1 | 4/2013 | Chari et al. |
| 2013/0236090 A1 | 9/2013 | Porikli et al. |
| 2013/0245429 A1 | 9/2013 | Zhang et al. |
| 2014/0040176 A1 | 2/2014 | Balakrishnan et al. |
| 2014/0152849 A1 | 6/2014 | Bala et al. |
| 2014/0187427 A1 | 7/2014 | MacReady et al. |
| 2014/0200824 A1 | 7/2014 | Pancoska |
| 2014/0201208 A1 | 7/2014 | Satish et al. |
| 2014/0214835 A1 | 7/2014 | Oehrle et al. |
| 2014/0279727 A1* | 9/2014 | Baraniuk ................ G09B 7/00 706/11 |
| 2014/0297235 A1 | 10/2014 | Arora et al. |
| 2015/0006443 A1 | 1/2015 | Rose et al. |
| 2015/0242463 A1 | 8/2015 | Lin et al. |
| 2015/0317558 A1 | 11/2015 | Adachi et al. |
| 2016/0019459 A1* | 1/2016 | Audhkhasi ............. G06N 7/005 706/22 |
| 2016/0042294 A1 | 2/2016 | MacReady et al. |
| 2016/0078600 A1 | 3/2016 | Perez Pellitero et al. |
| 2016/0110657 A1 | 4/2016 | Gibiansky et al. |
| 2016/0174902 A1 | 6/2016 | Georgescu et al. |
| 2016/0191627 A1 | 6/2016 | Huang et al. |
| 2016/0307305 A1 | 10/2016 | Madabhushi et al. |
| 2017/0255871 A1 | 9/2017 | Macready et al. |
| 2017/0300817 A1 | 10/2017 | King et al. |
| 2018/0018584 A1* | 1/2018 | Nock ..................... G06N 20/00 |
| 2018/0025291 A1* | 1/2018 | Dey ....................... G06N 20/00 706/11 |
| 2018/0082172 A1* | 3/2018 | Patel ........................ G06N 3/08 |
| 2018/0137422 A1* | 5/2018 | Wiebe ................... G06N 20/00 |
| 2018/0157923 A1 | 6/2018 | El Kaliouby et al. |
| 2018/0165554 A1* | 6/2018 | Zhang .................... G06N 7/005 |
| 2018/0165601 A1 | 6/2018 | Wiebe et al. |
| 2018/0277246 A1 | 9/2018 | Zhong et al. |
| 2019/0005402 A1* | 1/2019 | Mohseni ................ G06N 20/00 |
| 2019/0018933 A1* | 1/2019 | Oono ....................... G06N 7/08 |
| 2019/0030078 A1 | 1/2019 | Aliper et al. |
| 2019/0050534 A1 | 2/2019 | Apte et al. |
| 2019/0108912 A1 | 4/2019 | Spurlock et al. |
| 2019/0180147 A1* | 6/2019 | Zhang .................. G06K 9/6262 |
| 2019/0258907 A1 | 8/2019 | Rezende et al. |
| 2020/0410384 A1 | 12/2020 | Aspuru-Guzik et al. |

FOREIGN PATENT DOCUMENTS

| | | |
|---|---|---|
| CN | 102651073 A | 8/2012 |
| CN | 102324047 B | 6/2013 |
| CN | 102364497 B | 6/2013 |
| CN | 102037475 A | 9/2014 |
| CN | 104050509 A | 9/2014 |
| CN | 104766167 A | 7/2015 |
| CN | 104919476 A | 9/2015 |
| CN | 106569601 A * | 4/2017 |
| JP | 2011008631 A | 1/2011 |
| WO | 2017/031356 A1 | 2/2017 |
| WO | 2017/031357 A1 | 2/2017 |
| WO | WO-2017124299 A1 * | 7/2017 |
| WO | 2017/132545 A1 | 8/2017 |
| WO | 2019118644 A1 | 6/2019 |

OTHER PUBLICATIONS

Courville et al., "A Spike and Slab Restricted Boltzmann Machine", 2011, Proceedings of the Fourteenth International Conference on Artificial Intelligence and Statistics, JMLR Workshop and Conference Proceedings 15:233-241 (Year: 2011).*

Gal et al., "Bayesian Convolutional Neural Networks with Bernoulli Approximate Variational Inference", Jan. 18, 2016, arXiv: 1506.02158 [stat.ML] (Year: 2016).*

Lin et al., "Efficient Piecewise Training of Deep Structured Models for Semantic Segmentation", Jun. 6, 2016, Proceedings of the IEEE Conference on Computer Vision and Pattern Recognition (CVPR), pp. 3194-3203 (Year: 2016).*

Sukhbaatar et al., "Training Convolutional Networks with Noisy Labels", Apr. 10, 2015, arXiv:1406.2080v4 [cs.CV] (Year: 2015).*

Van der Maaten et al., "Hidden-Unit Conditional Random Fields", 2011, Proceedings of the Fourteenth International Conference on Artificial Intelligence and Statistics, JMLR Workshop and Conference Proceedings 15:479-488 (Year: 2011).*

Krause et al., "The Unreasonable Effectiveness of Noisy Data for Fine-Grained Recognition", 2016, Springer International Publishing AG, ECCV 2016, Part III, LNCS 9907, pp. 301-320 (Year: 2016).*

Szegedy et al., "Rethinking the Inception Architecture for Computer Vision", 2016, Proceedings of the IEEE Conference on Computer Vision and Pattern Recognition (CVPR), pp. 2818-2826 (Year: 2016).*

Bielza et al., "Bayesian networks in neuroscience: a survey", Oct. 16, 2014, Frontiers in Computational Neuroscience, vol. 8, Article 131, p. 1-23 (Year: 2014).*

Murray et al., "Bayesian Learning in Undirected Graphical Models: Approximate MCMC algorithms", 2004, In Proceedings of the 20th conference on Uncertainty in artificial intelligence (UAI '04). AUAI Press, Arlington, Virginia, USA, 392-399. (Year: 2004).*

Scarselli et al., "The Graph Neural Network Model", 2009, IEEE Transactions on Neural Networks, vol. 20, No. 1, pp. 61-80. (Year: 2009).*

(56) References Cited

OTHER PUBLICATIONS

Suzuki et al., "Joint Multimodal Learning With Deep Generative Models", Nov. 7, 2016, arXiv:1611.01891v1 (Year: 2016).*
Ororbia et al., "Online Semi-Supervused Learning with Deep Hybrid Boltzmann Machines and Denoising Autoencoders" Jan. 18, 2016, ICLR, arXiv: 1511.06964v7, pp. 1-17. (Year: 2016).*
Awasthi et al., "Efficient Learning of Linear Seperators under Bounded Noise" Mar. 12, 2015, arXiv: 1503.03594v1, pp. 1-23. (Year: 2015).*
Awasthi et al., "Learning and 1-bit Compressed Sensing under Asymmetric Noise" Jun. 6, 2016, JMLR, pp. 1-41. (Year: 2016).*
Achille et Soatto, "Information Dropout: Learning Optimal Representations Through Noise" Nov. 4, 2016, ICLR, arXiv: 1611.01353v1, pp. 1-12. (Year: 2016).*
Omidshafiei et al., "Hierarchical Bayesian Noise Inference for Robust Real-time Probabilistic Object Classification" Jul. 14, 2016, arXiv: 1605.01042v2, pp. 1-9. (Year: 2016).*
Xu et Ou "Joint Stochastic Approximation Learning of Helmholtz Machines" Mar. 20, 2016, ICLR arXiv: 1603.06170v1, pp. 1-8. (Year: 2016).*
Korenkevych et al., "Benchmarking Quantum Hardware for Training of Fully Visible Boltzmann Machines" Nov. 14, 2016, arXiv: 1611.04528v1, pp. 1-22. (Year: 2016).*
Benedtti et al., "Quantum-assisted learning of graphical models with arbitrary pairwise connectivity" Sep. 8, 2016, arXiv: 1609.02542v1, pp. 1-13. (Year: 2016).*
Bornschien et al., "Bidirectional Helmholtz Machines" May 25, 2016, arXiv: 1506.03877v5. (Year: 2016).*
Blanchard et al., "Classification with Asymmetric Label Noise: Consistency and Maximal Denoising" Aug. 5, 2016, arXiv: 1303.1208v3, pp. 1-47. (Year: 2016).*
Jain et al., "Estimating the class prior and posterior from noisy positives and unlabeled data" Jun. 28, 2016, arXiv: 1606.08561v1, pp. 1-19. (Year: 2016).*
Ke et al., "Variational Convolutional Networks for Human-Centric Annotations" Nov. 20, 2016, pp. 120-135. (Year: 2016).*
Liu et Tao, "Classification with Noisy Labels by Importance Reweighting" Mar. 2016, pp. 447-461. (Year: 2016).*
Menon et al., "Learning from Binary Labels with Instance-Dependent Corruption" May 4, 2016, pp. 1-41. (Year: 2016).*
Shah et al., "Feeling the Bern: Adaptive Estimators for Bernoulli Probabilities of Pairwise Comparisons" Mar. 22, 2016, pp. 1-33. (Year: 2016).*
Tosh, Christopher, "Mixing Rates for the Alternating Gibbs Sampler over Restricted Boltzmann Machines and Friends" Jun. 2016. (Year: 2016).*
Serban et al., "Multi-Modal Varational Encoder-Decoders" Dec. 1, 2016, arXiv: 1612.00377v1, pp. 1-18. (Year: 2016).*
Wang et al., "Paired Restricted Boltzmann Machine for Linked Data" Oct. 2016. (Year: 2016).*
Rolfe, Jason Tyler "Discrete Variational Autoencoders" Sep. 7, 2016, arXiv: 1609.02200v1, pp. 1-29. (Year: 2016).*
Kingma et al., "Improving Varational Inference with Inverse Autoregressive Flow" Jun. 15, 2016, arXiv: 1606.04934v1, pp. 1-10. (Year: 2016).*
Chen et al., "Variational Lossy Autoencoder" Nov. 8, 2016, arXiv: 1611.02731v1, pp. 1-13. (Year: 2016).*
van Rooyen et Menon "Learning with Symmetric Label Noise: The Importance of Being Unhinged" May 28, 2015, arXiv: 1505.07634v1, pp. 1-30. (Year: 2016).*
Misra et al., "Seeing through the Human Reporting Bias: Visual Classifiers from Noisy Human-Centric Labels," *2016 IEEE Conference on Computer Vision and Pattern Recognition*, IEEE, 2016, pp. 2930-2939.
Patrini et al., "Making Neural Networks Robust to Label Noise: a Loss Correction Approach," *arXiv: 1609.03683v1*, 2016, 14 pages.
Raymond et al., "Systems and Methods for Comparing Entropy and KL Divergence of Post-Processed Samplers," U.S. Appl. No. 62/322,116, filed Apr. 13, 2016, 47 pages.
Rolfe et al., "Discrete Variational Auto-Encoder Systems and Methods for Machine Learning Using Adiabatic Quantum Computers," U.S. Appl. No. 62/404,591, filed Oct. 5, 2016, 87 pages.
Vandat, "Machine Learning Systems and Methods for Training With Noisy Labels," U.S. Appl. No. 62/427,020, filed Nov. 28, 2016, 30 pages.
Vandat, "Machine Learning Systems and Methods for Training With Noisy Labels," U.S. Appl. No. 62/508,343, filed May 18, 2017, 46 pages.
Xiao et al., "Learning from Massive Noisy Labeled Data for Image Classification," *IEEE 2015 Conference on Computer Vision and Pattern Recognition*, IEEE, 2015, pp. 2691-2699.
Reed et al., "Training Deep Neural Networks on Noisy Labels with Bootstrapping," arXiv:1412.6596v3 [cs.CV] Apr. 15, 2015, 11 pages.
Rezende et al., "Stochastic Backpropagation and Approximate Inference in Deep Generative Models," arXiv:1401.4082v3 [stat.ML] May 30, 2014, 14 pages.
Sukhbaatar et al., "Training Convolutional Networks with Noisy Labels," arXiv:1406.2080v4 [cs.CV] Apr. 10, 2015, 11 pages.
Desjardins, G., Courville, A., Bengio, Y., Vincent, P., & Delalleau, O. "Parallel tempering for training of restricted Boltzmann machines", 2010.
Goodfellow et al., "Generative Adversarial Nets", arXiv:1406.2661v1, 9 pages, Jun. 10, 2014.
Hjelm, "Boundary-Seeking Generative Adversarial Networks", arXiv:1702.08431v4, 17 pages, Feb. 21, 2018.
Jenatton, R. et al., "Proximal Methods for Hierarchical Sparse Coding," arXiv:1009.2139v4, Jul. 5, 2011, 38 pages.
Mirza et al., "Conditional Generative Adversarial Nets", arXiv:1411.1784v1, 7 pages, Nov. 6, 2014.
Neven, H. et al., "QBoost: Large Scale Classifier Training with Adiabatic Quantum Optimization," JMLR: Workshop and Conference Proceedings 25, 2012, 16 pages.
Spall, "Multivariate Stochastic Approximation Using a Simultaneous Perturbation Gradient Approximation," IEEE Transaction on Automatic Control 37(3):332-341, 1992.
Strub, F., et al., "Hybrid Collaborative Filtering with Autoencoders," arXiv:1603.00806v3, Jul. 19, 2016, 10 pages.
Zhang et al., "Understanding Deep Learning Requires Re-Thinking Generalization", arXiv:1611.03530 Feb. 26, 2017. https://arxiv.org/abs/1611.03530.
Amin, et al., "Quantum Boltzmann Machine". arXiv:1601.02036v1, Jan. 8, 2016.
Bearman, et al., "What's the Point: Semantic Segmentation with Point Supervision". ECCV, Jul. 23, 2016. https://arix.org/abs/1506.02106.
Bell, et al., "The Independent Components" of Natural Scenes are Edge Filters, Vision Res. 37(23) 1997,; pp. 3327-3338.
Chen, et al., "Stochastic Gradient Hamiltonian Monte Carlo", arXiv:1402.4102 May 12, 2014. https://arxiv.org/abs/1402.4102.
Courbariaux, M., et al., "Binarized Neural Netowkrs: Training Neural Networks with Weights and Activations Constrained to +1 or −1". http://arix.org/pdf/1602.02830.pdf.
Dai, et al., "Generative Modeling of Convolutional Neural Networks". ICLR 2015.
G. Hinton, N. Srivastava, et. al, "Improving neural networks by preventing co-adaption of feature detectors". CoRR, abs/1207.0580, 2012.
Hinton, Geoffrey, "A Practical Guide to Training Restricted Boltzmann Machines", Version 1, Department of Computer Science University of Toronto, Aug. 2, 2010, 21 pages.
Hinton, Geoffrey E, et al., "Reducing the Dimensionality of Data with Neural Networks", Science, wwwsciencemag.org, vol. 313, Jul. 28, 2006, pp. 504-507.
Hurley, Barry, et al., "Proteus: A hierarchical Portfolio of Solvers and Transmation", arXiv:1306.5606v2, Feb. 17, 2014, 17 pages.
L.Wan, M. Zieler, et. al. , "Regularization of Neural Networks using DropConnect". ICML, 2013.
Lee, et al., "Efficient sparse coding algorithm", NIPS, 2007, pp. 801-808.

(56) References Cited

OTHER PUBLICATIONS

Misra, et al., "Seeing through the Human Reporting Bias: Visual Classifiers from Noisy Human-Centric Labels", 2016 IEEE Conference on Computer Vision and Pattern Recongition, IEEE, 2016, pp. 2930-2939.

Patrini, et al., Making Neural Networks robust to label noise: a loss correction approach. arXi: 1609.03683 (2016).

Xiao, et al., "Learning from massive noisy labeled data for image classification". The IEEE Conference on Computer Vision and Pattern Recognition (CVPR) 2015.

Berkley, A.J. et al., "Tunneling Spectroscopy Using a Probe Qubit," arXiv:1210.6310v2, Jan. 3, 2013, 5 pages.

Chinese Office Action for Application No. CN 2016800606343, dated May 8, 2021, 21 pages (with English translation).

Deng, J. et al., "ImageNet: A Large-Scale Hierarchical Image Database," Proceedings / CVPR, IEEE Computer Society Conference on Computer Vision and Pattern Recognition, 2009, 8 pages.

Dumoulin, V. et al., "On the Challenges of Physical Implementations of RBMs," Proceedings of the 28th AAAI Conference on Artificial Intelligence, vol. 2, Jul. 27, 2014, 7 pages.

Elkan, C., "Learning Classifiers from only Positive and Unlabled Data," KDD08: The 14th ACM SIGKDD International Conference on Knowledge Discovery and Data Mining Las Vegas Nevada USA Aug. 24-27, 2008, 8 pages.

Extended European Search Report for EP Application No. 16837862. 8, dated Apr. 3, 2019, 12 pages.

Fergus, R. et al., "Semi-Supervised Learning in Gigantic Image Collections," Advances in Neural Information Processing System, vol. 22, 2009, 8 pages.

First Office Action dated Nov. 29, 2021 in Cn App No. 2016800731803. (English Translation).

First Office Action issued in Chinese No. 2018101287473 with English translation, dated Jul. 12, 2021, 16 pages.

Friedman, et al., "Learning Bayesian Networks from Data", Internet Movie Database, http://www.imdb.com, 19 pages.

Fung, G. et al., "Parameter Free Bursty Events Detection in Text Streams," Proceedings of the 31st VLDB Conference, Trondheim, Norway, 2005, 12 pages.

Geordie, "Training DBMs with Physical neural nets" In Hack The Multiverse, Jan. 24, 2014, pp. 2-5.

Gómez-Bombarelli et al., "Automatic Chemical Design Using a Data-Driven Continuous Representation of Molecules," arXiv:1610. 02415v3: Dec. 2017. (26 pages).

Hinton et al., "A Practical Guide to Training Restricted Boltzmann Machines," Springer, pp. 599-619, Jan. 1, 2012.

Hinton, Geoffrey E. . Training products of experts by minimizing contrastive divergence. Neural Computation, 14:1771-1800, 2002.

Hinton, Geoffrey, Simon Osindero, and Yee-Whye Teh. A fast learning algorithm for deep belief nets. Neural computational, 18(7):1527-1554, 2006.

International Search Report and Written Opinion for PCT/US2018/ 065286, dated Apr. 16, 2019, 11 pages.

International Search Report and Written Opinion for PCT/US2019/ 017124, dated May 30, 2019, 28 pages.

International Search Report and Written Opinion of the International Searching Authority, dated Jan. 4, 2018, for International Application No. PCT/US2017/053303, 16 pages.

International Search Report and Written Opinion, dated Oct. 13, 2014, for International Application No. PCT/US2014/044421, 13 pages.

International Search Report, dated May 10, 2017, for International Application No. PCT/US2017/015401, 3 pages.

International Search Report, dated Nov. 18, 2016, for International Application No. PCT/US2016/047627, 3 pages.

Japanese Office Action for Application No. JP 2019516164, dated Nov. 24, 2021, 33 pages (including English translation).

Jordan, Michael I., Zoubin Ghahramnai, Tommi S Jaakola, and Lawrence K Saul. An introduction to variational methods for graphical models. Machines learning, 37(2):183-233, 1999.

Khalek, S. et al., "Automated SQL Query Generation for Systematic Testign of Database Engines," ASE'10: Proceedings of the IEEE/ACM International conference on Automated software engineering, 2010, 4 pages.

Korean Office Action for Application 10-2019-7012141, dated Nov. 29, 2021, 18 pages (including English translation).

Krähenbühl, P. et al., "Efficient Inference in Fully Connected CRFs with Gaussian Edge Potentials," arXiv:1210.5644, 2012, 9 pages.

Lafferty, J. et al., "Conditional Random Fields: Probabilistic Models for Segmenting and Labeling Sequence Data," Proceedings of the 18th International Conference on Machine Learning 2001, 10 pages.

Le, Quoc, Marc'Aurelio Ranzato, Rajat Monga, Matthieu Devin, Greg Corrado, Kai Chen, Jeff Dean, and Andrew Ng. Building high-level features usisng large scale unpervised learning. In ICML'2012, 2012.

LeCun, Y., L. Bottou, Y. Bengio, and P. Haffner. Gradient based learning applied to document recognition. Proc. IEEE, 1998.

Long, Philip M and Rocco Servdeio. Restricted boltzmann machines are hard to approximately evaluate or simulate. In Proceedings of the 27th International Conference on Machine Learning (ICML-10), pp. 703-710, 2010.

Minh, V. et al., "Learning to Label Aerial Images from Noisy Data," Proceedings of the 29th International Conference on Machine Learning, Edinburgh, Scotland, 2012, 8 pages.

Miyata et al., "Consideration of 2D-FFT by Decomposition-of-Large Scale Data on Multi-GPU", IEICE Technical Report, vol. 114, No. 155, Computer Systems Jul. 28-30, 2014, Abstract, 12 pages.

Mocanu et al., "A topological insight into restricted Boltzmann machines," Pre-print version: arXiv:1604.05978v2: Jul. 2016. (25 pages).

Natarajan, N. et al., "Learning with Noisy Labels," Advances in Neural Information Processing Systems 26, 2013, 9 pages.

Non-Final Office Action Issued in U.S. Appl. No. 15/753,661 dated Dec. 9, 2021, 15 pages.

Non-Final Office Action Issued in U.S. Appl. No. 16/336,625 dated Feb. 14, 2022, 22 pages.

Prakash, "Quantum Algorithms for Linear Algebra and Machine Learning," Doctoral Thesis, Technical Report No. UCB/EECS-2014-211, University of California at Berkeley, 2014, pp. 1-9.

Quattoni, A. et al., "Hidden Conditional Random Fields," IEEE Transactions on Pattern Analysis and Machine Intelligence, 29(10), 2007, 6 pages.

Rolfe et al., "Discrete Variational Auto-Encoder Systems and Method for Machine Learning Using Adiabatic Quantum Computers," U.S. Appl. No. 62/462,821, filed Feb. 23, 2017, 113 pages.

Rolfe et al., "Systems and Methods for Machine Learning Using Adiabatic Quantum Computer," U.S. Appl. No. 62/207,057, filed Aug. 19, 2015, 39 pages.

Rolfe, "Discrete Variational Auto-Encoder Systems and Methods for Machine Learning Using Adiabatic Quantum Computers," U.S. Appl. No. 62/206,974, filed Aug. 19, 2015, 43 pages.

Rolfe, "Discrete Variational Auto-Encoder Systems and Methods for Machine Learning Using Adiabatic Quantum Computers," U.S. Appl. No. 62/268,321, filed Dec. 16, 2015, 52 pages.

Rolfe, "Discrete Variational Auto-Encoder Systems and Methods for Machine Learning Using Adiabatic Quantum Computers," U.S. Appl. No. 62/307,929, filed Mar. 14, 2016, 67 pages.

Ross, S. et al., "Learning Message-Passing Inference Machines for Structured Prediction," CVPR 2011, 2011,8 pages.

Sakkaris, et al., "QuDot Nets: Quantum Computers and Bayesian Networks", arXiv:1607.07887v1 Jul. 26, 2016, 22 page.

Somma, R., S Boixo, and H Barnum. Quantum simulated annleaing. arXiv preprint arXiv:0712.1008, 2007.

"An implementation of the high-throughput computing system using the GPU (005)", no English translationS, 2019-516164, IEICE Technical Report, vol. 114 No. 302, Nov. 13-14, 2014, 12 pages.

"Neuro-computing for Parallel and Learning Information Systems", 2019-516164, www.jstage.jst.go.jp/article/sicej/1962/27/3/27_3_255/_article/-char/ja, Nov. 14, 2021, 17 pages.

(56) References Cited

OTHER PUBLICATIONS

Somma, RD, S Boixo, H Barnum, and E Knill. Quantum simulations of classical annealing processes. Physical review letters, 101(13):130504, 2008.
Suzuki, "Natural quantum resrvoir computing for temporal information processing", Scientific Reports, Nature Portfolio, Jan. 25, 2022.
Tucci, "Use of a Quantum Computer to do Importance and Metropolis-Hastings Sampling of a Classical Bayesian Network", arXiv:0811.1792v1 [quant-ph] Nov. 12, 2008, 41 pages.
van der Maaten, L. et al., "Hidden-Unit Conditional Random Fields," Journal of Machine Learning Research 15, 2011, 10 Pages.
Venkatesh, et al., "Quantum Fluctuation Theorems and Power Measurements," New J. Phys., 17, 2015, pp. 1-19.
Wang, Discovering phase transitions with unsupervised learning, Physical Review B 94, 195105 (2016), 5 pages.
Williams, "Simple Statistical Gradient-Following Algorithms for Connectionist Reinforcement Learning," College of Computer Science, Northeastern University, Boston, MA, 1992, 27 pages.
Written Opinion of the International Searching Authority, dated Nov. 18, 2016, for International Application No. PCT/US2016/047627, 9 pages.
Yoshihara et al., "Estimating the Trend of Economic Indicators by Deep Learning", 2019-516164, Graduate School of System Informatics, Kobe University, 28 Annual Conference of Japanese Society for Artificial Intelligence 2014, 10 pages.
Zhu, X. et al., "Combining Active Learning and Semi-Supervised Learning Using Gaussian Fields and Harmonic Functions,"ICML 2003 workshop on The Continuum from Labeled to Unlabeled Data in Machine Learning and Data Mining, 2003, 8 pages.
Bach, et al., "Optimization with Sparsity-Inducing Penalties". arXiv:1108.0775v2, Nov. 22, 2011.
Barron-Romero, Carlos, "Classical and Quantum Algorithms for Boolean Satisfiability Problem", CoRR, Abs/1510.02682 )Year:2015).
Bian, et al., "The Ising Model: teaching an old problem new tricks", D-wave systems. 2 (year 2010), 32 pages.
Cho, Kyunghyun, et al., "On the Properties of Neural Machine Translation: Encoder-Decoder Approaches", arXiv:1409.1259v2, [cs.CL] Oct. 7, 2014, 9 pages.
Fabius, Otto, et al., "Variational Recurrent Auto-Encoders", Accepted as workshop contributions at ICLR 2015, 5 pages.
Gregor, Karol, et al., "DRAW: A Recurrent Neural Network For Image Generation", Proceedings of the 32nd International Conference on Machine Learning, Lille, France, 2015, JMLR: W&CP vol. 37. Copyright 2015, 10 pages.
Hinton, "A practical Guide to Training Restricted Bolzmann Machines", Department of Computer Science university of Toronto, Aug. 2, 2010.
Hinton, Geoffrey E, et al., "Autoencoders, Minium Description Length and Helmholtz Free Energy", Department of Computer Science, University of Toronto, Computation Neuroscience Laboratory, The Salk Institute, Mar. 1, 2001, 9 pages.
Jiang, et al., "Learning a discriminative dictionary for sparse coding via label consistent K-SVD", In CVPR 2011 (pp. 1697-1704) IEEE. Jun. Year 2011).
Khalek, Shadi A, et al., "Automated SQL Query Generation for Systematic Testing of Database Engines", In proceedings of the IEEE/ACM International Conference of Automated Software Engineering pp. 329-332. Association of Computing Machinery. (Year: 2008).
Kingma, Diederik P, et al., "Semi-Supervised Learning with Deep Generative Models", arXiv:1406.5298v2 [cs.LG], Oct. 31, 2014, 9 pages.
Kuzelka, Ondrej, et al., "Fast Estimation of First-Order Clause Coverage through Randomization and Maximum Likelihood", In proceeding of the 25th International Conference on Machine Learning (pp. 504-5112). Association for Computing Machinery (Year:2008).

Le Roux, Nicolas, et al., "Representational Power of Restricted Boltzmann Machines and Deep Belief Networks", Dept. IRO, University of Montréal Canada, Technical Report 1294, Apr. 18, 2007, 14 pages.
Lee, et al., "Efficient Sparse Coding Algorithms". NIPS, pp. 801-808, 2007.
Makhzani, Alireza, et al., "Adversarial Autoencoders", arXiv:1511.05644v2 [cs.LG], May 25, 2016, 16 pages.
Misra, et al., "Visual classifiers from noisy humancentric labels". In The IEEE Conference on Computer Vision and Pattern Recognition (CVPR), 2016.
Mnih, Andriy, et al., "Variational Inference for Mote Carlo Objectives", Proceedings of the 33rd International Conference on Machine Learning, New York, NY USA, 2016, JMLR: W&CP vol. 48, 9 pages.
Molchanov, Dmitry, et al., "Variational Dropout Sparsifies Deep Neural Networks", https://arxiv.org/pdf/1701.05369v1.pdf, Jan. 19, 2017.
Muthukrishnan, et al., "Classical and quantum logic gates: an introduction to quantum computing", Quantum information seminar,)Year: 1999) 22 pages.
Neven, et al., "Training a binary classifier with the quantum adiabatic algorithm", arXiv preprint arXivc:0811.0416, 2008, 11 pages.
Olshausen, Bruno A, et al., "Emergence of simple cell receptive field properties by learning a sparse code for natural images", Nature, vol. 381, Jun. 13, 1996, pp. 607-609.
Rasmus, Antti, et al., "Semi-Supervised Learning with Ladder Networks", arXiv:1507.02672v2 [cs.NE] Nov. 24, 2015, 19 pages.
Saliman, Tim, "A Structured Variational Auto-encoder for Learning Deep Hierarchies of Sparse Features", arXiv:1602.08734v1 [stat.ML] Feb. 28, 2016, 3 pages.
Smelyanskiy, et al., "A near-term quantum computing approach for hard computational problems in space exploration" arXiv preprint arXir:1204.2821 (year:2012).
Sprechmann, et al., "Dictionary learning and sparse coding for unsupervised clustering", in 2010 IEEE international conference on acoustics, speech and signal processing (pp. 2042-2045) IEEE (year:2010).
Wiebe, Nathan, et al., "Quantum Inspired Training for Boltzmann Machines", arXiv:1507.02642v1 [cs.LG] Jul. 9, 2015, 18 pages.
Zhang, Yichuan, et al., "Continuous Relaxations for Discrete Hamiltonian Monte Carlo", School of Informatic, University of Edinburgh, Dept of Engineering, University of Cambridge, United Kingdom, 9 pages.
Zheng, et al., "Graph regularized sparse coding for image representation", IEEE transaction on image processing, 20(5), (Year: 2010) 1327-1336.
Non Final Office Action for U.S. Appl. No. 16/270,273, dated Jun. 27, 2022, 13 pages.
Notice of Allowance for U.S. Appl. No. 16/682,976, dated May 27, 2022, 11 pages.
Notice of Allowance for U.S. Appl. No. 16/714,103, dated Jun. 3, 2022, 9 pages.
Nalisnick, Eric, Lars Hertel, and Padhraic Smyth. "Approximate inference for deep latent gaussian mixtures." NIPS Workshop on Bayesian Deep Learning. vol. 2, 2016. (Year: 2016).
Non-Final Office Action Issued in U.S. Appl. No. 16/562,192 dated Apr. 4, 2022, 37 pages.
Salimans, Tim, and David A. Knowles. "Fixed-form variational posterior approximation through stochastic linear regression." Bayesian Analysis 8.4 (2013): 837-882. (Year: 2013).
Salimans, Tim. "A structured variational auto-encoder for learning deep hierarchies of sparse features." arXiv preprint arXiv: 1602.08734 (2016). (Year: 2016).
Notice of Allowance for U.S. Appl. No. 16/772,094, dated Jun. 29, 2022, 12 pages.

* cited by examiner

MACHINE LEARNING SYSTEMS AND METHODS FOR TRAINING WITH NOISY LABELS

FIELD

This disclosure generally relates to machine learning, and in particular to machine learning systems and methods which are robust against label noise in training datasets in at least some circumstances.

BACKGROUND

In machine learning applications, the performance of a classification model is typically highly dependent on the availability of a large collection of high quality annotated data to use in training the model. Deep neural networks, for example, tend to be particularly sensitive to the quality of annotations. Classification models generally require large quantities of data for training. However, in most circumstances, obtaining large quantities of noise-free training data is a costly and tedious process. For instance, training data for classification models is often generated via a labeling process which annotates the training data with labels. A typical labelling process involves training multiple annotators to assign labels correctly (i.e. with a low incidence of noise) and aggregating their feedback, which tends to be resource-intensive.

It is sometimes possible to obtain lower-quality training data with relatively less effort. For instance, training data with noisy labels may be drawn from sources such as social media websites, search engines, or crowd annotation services (e.g. via the Internet). As an example, images returned from a search engine for a particular set of queries (such as cats, dogs, rabbits, etc.) may be labelled with those queries and used as training data. Some of the images returned will not feature the queried entity (e.g. results for the query "cat" may include an image for a toy mouse taken from a page relating to the care of cats), and so the applied label may be incorrect. Accordingly, the training data may be considered to have noisy labels.

It is sometimes possible to attempt to "clean up" the noisy data, for example by employing a crowdsourcing service to find incorrect labels. This may incur additional cost, but may increase the quality of the training data. It may also be possible to ignore the presence of noise and train conventional models on the noise-laden data. This may result in a loss in performance, e.g. in the form of an increased error rate relative to models with less-noisy data, but for some applications the resulting model may be "good enough" even with the effects of noise.

Some approaches, however, have attempted to provide classification models which model label noise explicitly in order to gain robustness against such noise. For instance, a technique which models confusion between labels is described by Giorgio Patrini, Alessandro Rozza, Aditya Menon, Richard Nock, and Lizhen Qu, *Making neural networks robust to label noise: a loss correction approach*, arXiv:1609.03683, 2016. Another technique is described by Tong Xiao, Tian Xia, Yi Yang, Chang Huang, and Xiaogang Wang, *Learning from massive noisy labeled data for image classification*, In The IEEE Conference on Computer Vision and Pattern Recognition (CVPR), June 2015 and extended by Ishan Misra, C. Lawrence Zitnick, Margaret Mitchell, and Ross Girshick, *Seeing through the human reporting bias: Visual classifiers from noisy human-centric labels*, In The IEEE Conference on Computer Vision and Pattern Recognition (CVPR), June 2016 to model "visual presence" and "relevance" of concepts for each instance as a way to correct for label noise introduced by human-centric biases.

There is thus a general desire for systems and methods for performing machine learning which are robust to noisy labels and are applicable to a broad range of machine learning problems.

The foregoing examples of the related art and limitations related thereto are intended to be illustrative and not exclusive. Other limitations of the related art will become apparent to those of skill in the art upon a reading of the specification and a study of the drawings.

BRIEF SUMMARY

There exists a need to be able to processor at least some problems having size and/or connectivity greater than (and/or at least not fully provided by) the working graph of an analog processor. Computational systems and methods are described which, at least in some implementations, allow for the computation of at least some problem graphs which have representations which do not fit within the working graph of an analog processor (e.g. because they require more computation devices and/or more/other couplers than the processor provides).

Some implementations provide a method for instantiating a machine learning system for classifying one or more observed elements of an input dataset, the input dataset labelled with one or more observed labels drawn from a plurality of binary labels, the method executed by at least one processor in communication with at least one memory and comprising: instantiating a recognition system in the at least one memory, the recognition system operable to classify elements of the input dataset by generating a classification probability for the at least one observed element; instantiating an approximating posterior system in the at least one memory, the approximating posterior system approximating a true posterior distribution corresponding to a prior distribution which models label noise as a set of stochastic label flips on the plurality of binary labels, each label flip indicating a belief in the correctness of a corresponding label, the approximating posterior system operable to generate a posterior probability for one or more label flips for the observed element given the one or more observed labels; and training at least one of the recognition system and the approximating posterior distribution based on a training dataset, the prior distribution, and the approximating posterior distribution.

In some implementations, the method further comprises instantiating a shared transformation system in the at least one memory, the shared transformation system operable to receive the one or more observed elements and to generate a representation of the observed elements based on one or more shared parameters, wherein the recognition system and the approximating posterior system are operable to receive the representation of the observed elements as input.

In some implementations, training at least one of the recognition system and the approximating posterior system comprises training the shared transformation system to generate the one or more shared parameters. In some implementations, at least one of the recognition system and the approximating posterior system comprises a deep neural network. In some implementations, at least one of selecting the prior distribution, selecting the recognition model, and selecting the approximating posterior distribution comprises selecting a predetermined distribution or model.

In some implementations, the prior distribution comprises a factorial distribution, a Boltzmann distribution, and/or a spike (the spike defining a high-probability state in the prior distribution). In some implementations, the high-probability state comprises the state where no labels are flipped.

In some implementations, the approximating posterior distribution comprises a factorial distribution and/or a spike (the spike defining a high-probability state in the prior distribution). In some implementations, the high-probability state comprises the state where no labels are flipped.

In some implementations, the approximating posterior distribution comprises a directed graphical model, the directed graphical model operable to generate, given an initial class, a probability of label change for each of one or more remaining classes.

In some implementations, the method further comprises selecting one of the prior distribution and the approximating posterior distribution based on a previous selection of the other one of the prior distribution and the approximating posterior distribution. In some implementations, the prior distribution comprises a Boltzmann distribution with a spike and the approximating posterior distribution comprises a factorial distribution with a spike.

In some implementations, training comprises optimizing an objective function, the objective function comprising a variational lower bound. In some implementations, the variational lower bound comprises a difference between and a true log likelihood of the data and a KL distance between the true and approximating posterior distributions. In some implementations, training comprises optimizing the variational lower bound using stochastic gradient descent.

BRIEF DESCRIPTION OF THE SEVERAL VIEWS OF THE DRAWING(S)

In the drawings, identical reference numbers identify similar elements or acts. The sizes and relative positions of elements in the drawings are not necessarily drawn to scale. For example, the shapes of various elements and angles are not necessarily drawn to scale, and some of these elements may be arbitrarily enlarged and positioned to improve drawing legibility. Further, the particular shapes of the elements as drawn, are not necessarily intended to convey any information regarding the actual shape of the particular elements, and may have been solely selected for ease of recognition in the drawings.

DETAILED DESCRIPTION

In the following description, certain specific details are set forth in order to provide a thorough understanding of various disclosed implementations. However, one skilled in the relevant art will recognize that implementations may be practiced without one or more of these specific details, or with other methods, components, materials, etc. In other instances, well-known structures associated with computer systems, server computers, and/or communications networks have not been shown or described in detail to avoid unnecessarily obscuring descriptions of the implementations.

Unless the context requires otherwise, throughout the specification and claims that follow, the word "comprising" is synonymous with "including," and is inclusive or open-ended (i.e., does not exclude additional, unrecited elements or method acts).

Reference throughout this specification to "one implementation" or "an implementation" means that a particular feature, structure or characteristic described in connection with the implementation is included in at least one implementation. Thus, the appearances of the phrases "in one implementation" or "in an implementation" in various places throughout this specification are not necessarily all referring to the same implementation. Furthermore, the particular features, structures, or characteristics may be combined in any suitable manner in one or more implementations.

As used in this specification and the appended claims, the singular forms "a," "an," and "the" include plural referents unless the context clearly dictates otherwise. It should also be noted that the term "or" is generally employed in its sense including "and/or" unless the context clearly dictates otherwise.

The headings and Abstract of the Disclosure provided herein are for convenience only and do not interpret the scope or meaning of the implementations.

Aspects of the present disclosure relate to machine learning classification models which are robust against label noise in at least some circumstances. Some implementations comprise systems and methods for instantiating machine learning systems which model noise explicitly. For example, in a machine learning system with binary labels, incorrect labels may be corrected by "flipping" the labels to their correct state. A distribution of label flips may be used to model labelling errors. As another example, interactions between "true" and "noisy" labels may be represented by an undirected graphical model. Training such a model may be assisted by incorporating an auxiliary distribution to guide inference of true labels. In some implementations, a general architecture for such machine learning systems is provided so that arbitrary machine learning recognition systems may be incorporated into the architecture, thereby permitting broad applicability of the presently-disclosed systems and methods.

Modelling Label Flips

Figure 1:
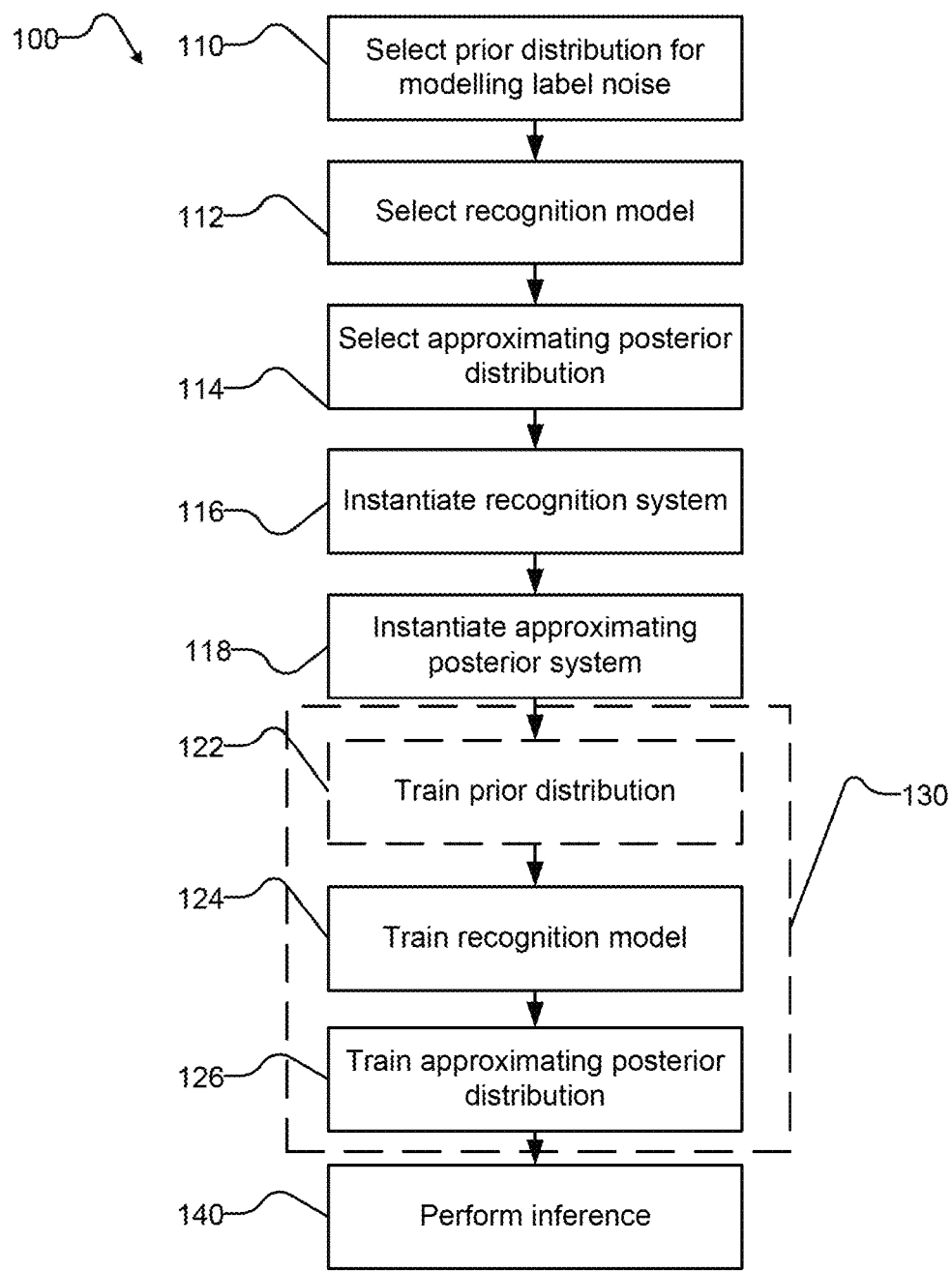
FIG. 1 is a flowchart illustrating an example method for instantiating a machine learning system which is robust against label noise in at least some circumstances.

FIG. 1 shows an example method 100 for instantiating an example machine learning system according to the present disclosure. At 110, a prior distribution for modelling label noise is selected. The prior distribution models label noise explicitly. In some implementations, the prior distribution models incorrect label choices. For example, the prior distribution may model label noise in the form of stochastic "label flips" on binary labels (i.e. labels which are either applied or not). In some implementations, the prior distribution models label flips in a structured way—for instance, images labeled with "boat" may be more likely to be labeled with "water", "kitten" with "cat", "horse" with "animal", and so on.

The following discussion will be assisted with the definition of some notation. The prior distribution is denoted herein by $p_\theta(t)$, where $\theta$ is a set of parameters and t is a vector of binary label flips. (The prior distribution may be defined over additional variables, which are omitted from the notation for simplicity.) Since $p_\theta(t)$ models label noise, it may generate higher probability for vectors t that are likely to correspond to label noise. Similarly, $p_\theta(t_l)$ denotes the probability of a label flip for the label l. A dataset of N elements to be processed by a machine learning system classifying L labels may be represented by $\{(x^{(n)}, y^{(n)})\}_{n=1}^{N}$ where $x^{(n)}$ is an element of the dataset (e.g. an image and/or some other data) and $y^{(n)} = \{y_1^{(n)}, y_2^{(n)}, \ldots, y_L^{(n)}\} \in \{0,1\}^L$ is the multi-label annotation vector for $x^{(n)}$.

In this notation, $y_l^{(n)} = 1$ denotes that element $x^{(n)}$ has been labelled with label l and $t_l = 1$ denotes that label l has been flipped (i.e. $y_l^{(n)}$ is 0 when it should be 1 or vice-versa). For example, label flip vector t may be defined according to the following formula:

$$y_l = \begin{cases} \hat{y}_l & \text{if } t_l = 0 \\ 1 - \hat{y}_l & \text{otherwise } \forall l \in \{1, 2, \ldots, L\} \end{cases}$$

where $\hat{y}^{(n)}$ are the ground truth labels for $x^{(n)}$ (which are not necessarily the same as observed labels $y^{(n)}$ and may not be known).

Several choices are possible for the prior distribution $p_\theta(t)$. As is discussed elsewhere here, the selection of the prior distribution may have ramifications on the selection of the (approximating) posterior distribution (selected at 114), and vice-versa. For instance, training the resulting system may involve calculating the KL divergence between the posterior and prior distributions, a calculation which will vary in complexity depending on the pair of distributions selected. Examples of distributions which may be used include a factorial distribution, a Boltzmann distribution, and a distribution (such as a Boltzmann distribution) with a "spike". These examples are discussed in greater detail below.

At 112, a recognition model is selected. The recognition model may be represented by $p_\theta(\hat{y}_l|x)$. The recognition model accepts an instance x and returns a probability of each class (each of which corresponds to a label) present in the instance, optionally along with other inputs and outputs. A computing system may instantiate the recognition model as, for example, a deep neural network, a logistic regression, and/or any other suitable machine learning technique.

At 114, an approximating posterior distribution is selected. The approximating posterior distribution approximates the true posterior distribution $p_\theta(t|x, y)$ and may be denoted $q_\phi(t|x, y)$, where $\phi$ represents the parameters of the approximating posterior distribution. Several choices are possible for the approximating posterior distribution $q_\phi(t|x, y)$. Examples of distributions which may be used include a factorial distribution, a directed graphical model, and/or a distribution with a spike. These examples are discussed in greater detail below.

One or more of the selections at 110, 112, and 114 may be made by a user and provided to a computing system. Alternatively, or in addition, one or more of the selections at 110, 112, and 114 may be made by the computing system, e.g. in response to identifying a characteristic of a problem, in response to an instruction, and/or by predetermination (e.g. the computing system may only be provided with one option to select from).

At 116 and 118, the recognition model and approximating posterior distribution are instantiated by a computing system as a recognition system and an approximating posterior system, respectively. Instantiation may comprise representing the relevant models and distributions with logical structures in a memory of the computing system. The instantiated systems direct the operation of one or more processors of the computing system. For example, the instantiated systems may comprise deep neural networks which are operable to take the inputs required by the model (or distribution) and to generate outputs which correspond to the outputs of the model (or distribution). Examples of instantiations of acts 116 and 118 are discussed in greater detail below with reference to FIGS. 3A and 3B.

At 130, the machine learning system is instantiated based on the selected distributions and trained. The prior distribution, recognition model, and posterior distribution may be trained separately or together. Their training acts are shown as 122, 124, and 126, respectively. In some implementations, the prior distribution is fixed during training; it may be trained prior to the training of the machine learning system, may be pre-determined, and/or may be fixed during training of the machine learning system. Accordingly, 122 (corresponding to the training of the prior distribution) is shown as optional by rendering it in dashed lines in FIG. 1. In some implementations, the recognition model and posterior distribution are trained together.

As will be familiar to skilled readers, learning parameters of a machine learning system, such as a neural network, may involve optimizing a log likelihood function with the following general form:

$$\max_\theta \frac{1}{N} \sum_n^N \sum_l^L \log(p_\theta(y_l^{(n)} | x^{(n)})).$$

The variable $t_l$ is latent, which allows the probability distribution $p_\theta(y_l^{(n)}|x^{(n)})$ to be decomposed by marginalizing $t_l$, thereby yielding the following marginalized expression (the (n) superscript notation is omitted for simplicity):

$$p_\theta(y_l | x) = \sum_{t_l} p_\theta(y_l | t_l, x) p_\theta(t_l)$$

This representation invokes the conditional distribution $p_\theta(y_l|t_l, x)$, which may be given by:

$$p_\theta(y_l|t_l,x) = p_\theta(\hat{y}_l = y_l|x)^{1-t_l}(1 - p_\theta(\hat{y}_l = y_l|x))^{t_l}$$

where the binary flip vector t and its elements $t_l$ are as defined previously.

Label flips may be structured if an appropriate prior distribution is selected. For instance, changing an image's label from "cat" to "dog" may involve changing two binary labels together. Appropriate prior distributions include certain non-factorial distributions (such as non-factorial Boltzmann distributions, with or without a spike), which may be able to represent all label flips together. In circumstances where it is necessary or desirable to represent structured label flips, however, it may be appropriate to extend the marginalized distribution given above across all label flips (i.e. to extend the above expressions to the vector t), thereby enabling the representation of correlations between individual flips $t_l$. This extension may yield the following formula:

$$p_\theta(y \mid x) = \sum_t p_\theta(y \mid t, x) p_\theta(t).$$

Figure 2:
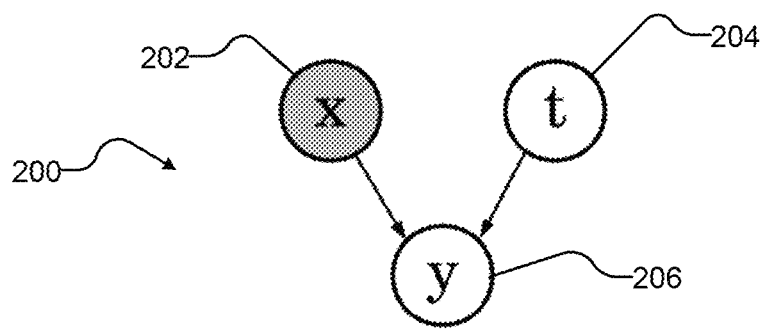
FIG. 2 is a Bayesian network diagram illustrating an example set of relationships between variables in a marginalized distribution.

This marginalized distribution may be represented using Bayesian network 200 shown in FIG. 2. In the illustrated graphical model, t (shown as variable 204) is independent from x (shown as variable 202) unless y (shown as variable 206) is observed. Similarly, we can extend the conditional distribution given above across all label flips to yield:

$$p_\theta(y \mid t, x) = \prod_l p_\theta(\hat{y}_l = y_l \mid x)^{1-t_l}(1 - p_\theta(\hat{y}_l = y_l \mid x))^{t_l}.$$

In some implementations, act 130 comprises optimizing an objective function to train the parameters $\theta$ and/or $\phi$. In some implementations, the objective function comprises a variational lower bound on a marginal likelihood of the selected distributions. For example, the variational lower bound V may be calculated by substracting the KL distance between the true and approximating posterior distributions from the true log likelihood of the data. The KL term acts as a regularizer on the approximating posterior $q_\phi(t|x, y)$ which, in effect, penalizes $q_\phi(t|x, y)$ for diverging significantly from the prior $p_\theta(t)$. This may be expressed as follows:

$$V = \log p_\theta(y|x) - KL(q_\phi(t|x,y) \| p_\theta(t|x,y))$$

which, assuming independence of t and x given unobserved y, may be reduced to the following formula:

$$V = \mathbb{E}_{q_\phi(t|x,y)}[\log p_\theta(y|t,x)] - KL(q_\phi(t|x,y) \| p_\theta(t))$$

where $\mathbb{E}_{q_\phi(t|x, y)}$ denotes an expectation value dependent only on the marginal distribution $q_\phi(t_l|x, y)$. This can be calculated exactly for certain families of distributions, including the families of distributions provided as examples herein. This expectation value may be expressed as follows:

$$\mathbb{E}_{q_\phi(t|x,y)}[\log p_\theta(y \mid t, x)] = \sum_l (1 - q_\phi(t_l = 1 \mid x, y)) \log p_\theta(\hat{y}_l = y_l \mid x) +$$

$$q_\phi(t_l = 1 \mid x, y) \log(1 - p_\theta(\hat{y}_l = y_l \mid x))$$

Note that the unary marginal distribution $q_\phi(t_l=1|x, y)$ corresponds to the probability that the $l^{th}$ label should be flipped, which is conditional on both the instance x and the observed label y. Accordingly, this model may be viewed intuitively as a tool which uses the approximating posterior distribution to change the $l^{th}$ label if the observed label is incompatible with or unlikely to be combined with the instance x.

The machine learning system may be trained by optimizing the variational lower bound using stochastic gradient descent and/or any other suitable optimization approach. In some implementations, the objective function to be optimized may be expressed as follows:

$$\max_{\theta,\phi} \frac{1}{N} \sum_n^N \mathbb{E}_{q_\phi(t|x^{(n)}, y^{(n)})}[\log p_\theta(y^{(n)} \mid t, x^{(n)})] - KL(q_\phi(t \mid x^{(n)}, y^{(n)}) \| p_\theta(t)).$$

At 140, the trained machine learning system performs inference based on the trained distributions. In particular, the recognition system proposes (infers) a set of labels ŷ for a given input x based on the conditional distribution $p_\theta(\hat{y}|x)$ which it encodes.

The presently-described systems and methods provide a significant degree of flexibility. For instance, the prior distribution may optionally be used to limit the willingness of the instantiated machine learning system to change labels (e.g. by adding one or more spikes and/or by adjusting a mixing parameter, discussed below). The prior distribution may encode a belief about label noise by training the distribution from a "clean" dataset (i.e. one with no or limited errors relative to data encountered in ordinary use) and/or from a noisy dataset (in which case the KL term may contribute to the training of the prior distribution).

At least some implementations described herein accommodate the multi-labeling problem where each instance can have multiple labels. The recognition system selected at 112 has only limited constraints, namely that it accepts data as input and provides classification probabilities as output, although other inputs and/or outputs may be provided. Further, for appropriate pairs of prior and approximating posterior distributions, it may be possible in some circumstances to calculate the objective function analytically and to perform training using widely-available machine learning software, such as Tensorflow™.

Figure 3A:
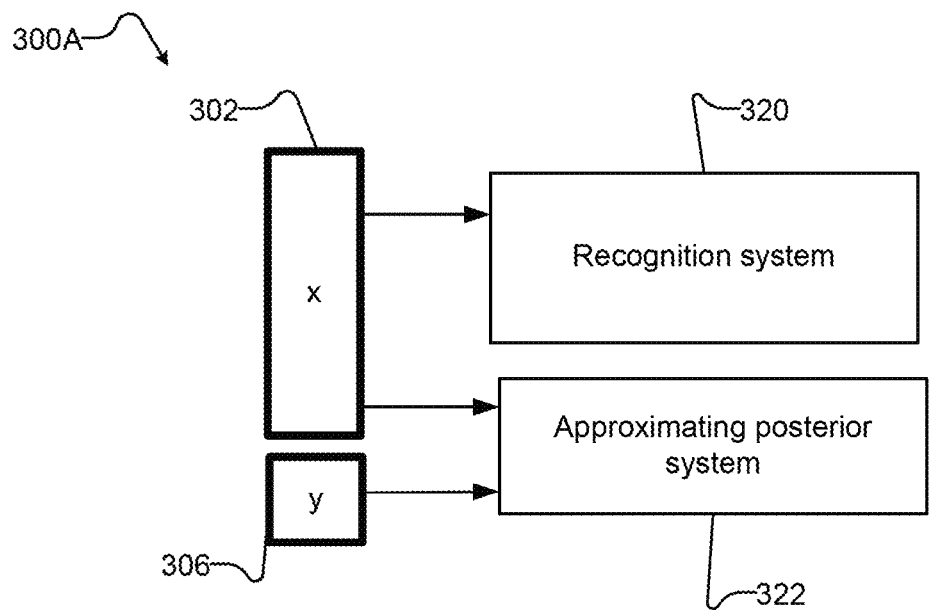
FIG. 3A shows schematically an architecture of an example machine learning system wherein a recognition system and an approximating posterior distribution each receive an input variable.
Figure 3B:
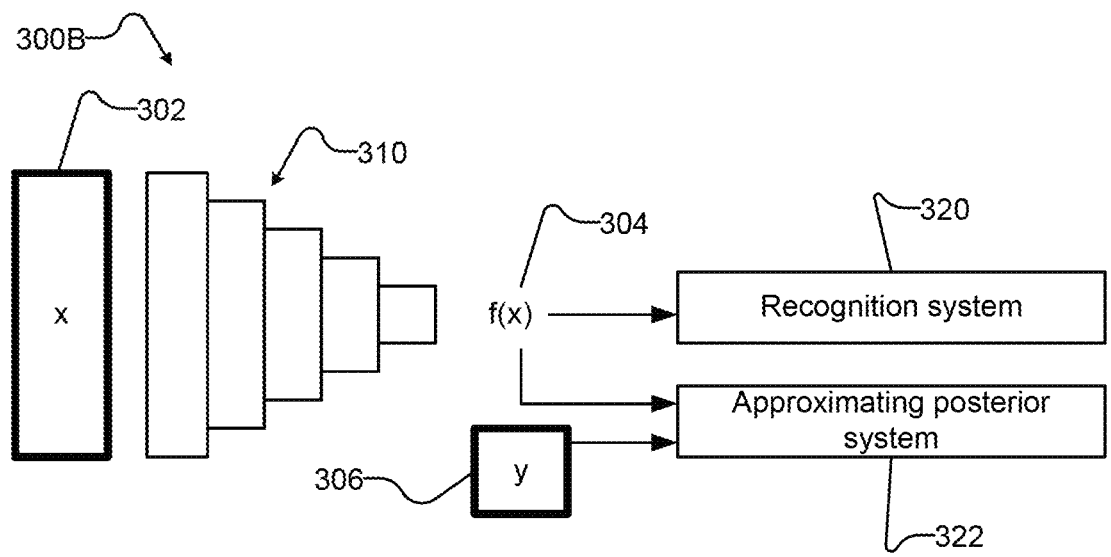
FIG. 3B shows schematically an architecture of an example machine learning system wherein a shared transformation system for transforming an input variable is shared between a recognition system and an approximating posterior distribution.

FIGS. 3A and 3B show example architectures 300A and 300B, respectively, of the machine learning system instantiated by the presently-described systems and methods. In FIG. 3A, each of recognition system 320 and approximating posterior system 322 receive input data 302 (denoted x), train on that input (and potentially other inputs), and generate parameters. Approximating posterior system 322 also receives input labels 306, denoted y. Approximating posterior system 322 models the approximating posterior distribution; for example, approximating posterior system 322 may comprise a machine learning system, such as a deep neural network, which is configured to provide output based on the selected approximating posterior distribution. Recognition system 320 is also a machine learning system, and may be a type of machine learning system which is the same as or different than approximating posterior system 322. In some implementations, both approximating posterior system 322 and recognition system 320 comprise deep neural networks.

In some implementations, recognition system 320 and approximating posterior system 322 share an input variable transformation system 310, as shown in architecture 300B of FIG. 3B. Transformation system 310 receives input variable 302 (e.g. x) as input and generates a representation 304, denoted f(x), as output. Representation 304 is received by recognition system 320 and approximating posterior system 322 as input. This shared architecture allows for parameter and/or representation sharing between recognition system 320 and approximating posterior system 322, which may reduce the complexity of those systems and/or enable the processing of relatively larger problems than is enabled by architecture 300A in at least some circumstances.

Architectures 300A and 300B define schematically a computing system which has instantiated a machine learning system according to the present disclosure. Aspects of architectures 300A and 300B may be represented in a memory of the computing system, and aspects of architectures may direct the operation of one or more processors of the computing system. For example, shared transformation system 310 may be represented in memory as a deep neural network and its logical structure may direct the operation of one or more processors in the transformation of input 302 to representation 304.

As mentioned above, a variety of prior and approximating posterior distributions may be used in the presently-described systems and methods. The selection of such distributions will impact the calculation of the KL term, among other things. Examples of prior distributions, approximating posterior distributions, and KL term calculations are provided below.

Examples of Prior Distributions

In some implementations, prior distribution $p_\theta(t)$ comprises a factorial distribution defined by:

$$p_\theta(t) = \prod_l \theta_l^{t_l}(1-\theta_l)^{(1-t_l)}$$

where $\theta_l$ is a parameter that controls the frequency with which the posterior distribution flips labels. For example, forcing $\theta_l \to 0$ will penalize the posterior distribution for flipping labels and will therefore result in less frequent label flips. The factorial distribution is relatively simple, which can provide computational advantages, but that simplicity does not allow for the convenient representation of structure or correlations in label noise; in effect, this distribution represents a general belief of the noise level for each label independently.

In some implementations, prior distribution $p_\theta(t)$ comprises a non-factorial Boltzmann distribution defined by:

$$p_\theta(t) = \frac{1}{Z_\theta} e^{-t^T \theta t}$$

where $\theta$ is an upper triangular matrix representing the correlations on label changes for different classes and $Z_\theta$ is a partition function (or normalizing coefficient) which scales $p_\theta(t)$ to be a valid probability distribution. The Boltzmann distribution permits the representation of structure and is a convenient selection for a variety of posterior distributions.

In some implementations, a Boltzmann prior distribution $p_\theta(t)$ may be modified to provide a high probability in a particular state via addition of a "spike". For example, the state t=0 (which corresponds to no flips in the observed label) may be given a higher probability by adding a distribution around that state, such as a delta distribution $\delta(t)$. For example, the following distribution may be added:

$$p_{\alpha,\theta}(t) = (1-\alpha)\delta(t) + \alpha p_\theta(t) \text{ where } \delta(t) = \begin{cases} 1 & \text{if } t_l = 0 \ \forall \ l \\ 0 & \text{otherwise} \end{cases}$$

where $\alpha$ is a mixing coefficient which balances the belief between the selected state (0 in this example) and the prior distribution represented by $p_\theta(t)$. Adding a spike at t=0 will tend to reduce the frequency with which the model changes labels. This effect may be increased by increasing the value of the mixing coefficient $\alpha$ or reduced by decreased the value of $\alpha$.

Examples of Approximating Posterior Distributions

In some implementations, approximating posterior distribution $q_\phi(t|x, y)$ comprises a factorial distribution defined by:

$$q_\phi(t|x,y) = \prod_l \mu_l(x, y; \phi)^{t_l}(1-\mu_l(x, y; \phi))^{(1-t_l)}$$

where $\mu_l(x, y; \phi)$ is a probability distribution with parameters $\phi$. For example, $\mu_l$ may be a sigmoid function generated by an approximating posterior system instantiated as a deep neural network with sigmoid activation in the last layer. The corresponding unary marginal distribution may be calculated analytically as follows:

$$q_\phi(t_l=1|x,y) = \mu_l(x,y;\phi).$$

As noted above with respect to the prior distribution, factorial distributions may provide some computational simplicity but tend to come with certain limitations. For instance, since factorial distributions are unimodal, such distributions may perform relatively poorly in circumstances where the true posterior is multi-modal. For example, if the input data x is labelled with "dog", the states corresponding to no change and switching the label "dog" with "cat" might each have high probability in the true posterior distribution; a factorial distribution may have some degree of difficulty in such circumstances.

In some implementations, approximating posterior distribution $q_\phi(t|x, y)$ comprises a combination of a base distribution $q'_\phi(t|x, y)$ with a spike (e.g. a delta distribution). For example, a spike around the t=0 state may be implemented according to the following formula:

$$q_\phi(t|x,y) = (1-\alpha(x,y))\delta(t) + \alpha(x,y)q'_\phi(t|x,y)$$

where $\alpha(x, y)$ is a function of x and y which defines a mixing coefficient between the delta and base distributions. For example, $\alpha$ may be a sigmoid function generated by an approximating posterior system instantiated as a deep neural network with sigmoid activation in the last layer. The unary marginal distribution may be calculated according to the following formula:

$$q_\phi(t_l=1|x,y) = \alpha(x,y)q'_\phi(t_l=1|x,y).$$

For example, for a factorial base distribution $q'_\phi(t|x, y)$, a factorial approximating posterior distribution may be implemented according to the following formula:

$$q_\phi(t|x, y) = (1-\alpha(x,y))\delta(t) + \alpha(x, y)\prod_l \mu_l(x, y; \phi)^{t_l}(1-\mu_l(x, y; \phi))^{(1-t_l)}$$

and the corresponding unary marginal distribution may be calculated according to the following formula:

$$q_\phi(t_l=1|x,y) = \alpha(x,y)\mu_l(x,y;\phi).$$

In some circumstances, label flips tend to be highly correlated. For example, in a multi-class problem where each instance belongs to only one class, each change from one label i to another j comprises two flips: one flip to i to turn it "off" and one flip to j to turn it "on". In the label flip vector t described elsewhere herein, it may then be expected that $t_i$ and $t_j$ will be highly correlated, since both are set to 1 in such an event.

In some implementations, approximating posterior distribution $q_\phi(t|x, y)$ comprises a directed graphical model. Conceptually, the directed graphical model represents each label as a node and provides the probability of a label flip for each class conditioned on the label flip for the annotated class (i.e. the observed label for the instance). More directly, assuming that an instance x belongs to class i, the probability of a label change for each of the remaining classes may be conditioned on i. For example, the approximating posterior distribution $q_\phi(t|x, y)$ may be defined by:

$$q_\phi(t \mid x, y) = q_\phi(t_i \mid x) \prod_{j \neq i} q_\phi(t_j \mid x, t_i) =$$

$$\mu_i(x; \phi)^{t_i}(1 - \mu_i(x; \phi))^{(1-t_i)} \prod_{j \neq i} \mu_j(x, t_i; \phi)^{t_j}(1 - \mu_j(x, t_i; \phi))^{(1-t_j)}.$$

The corresponding unary marginal distribution may be calculated according to the following formula:

$$q_\phi(t_l = 1 \mid x, y) = \begin{cases} \mu_l(x; \phi) & \text{if } l = i \\ (1 - \mu_i(x; \phi))\mu_l(x, t_i = 0; \phi) + \\ \mu_i(x; \phi)\mu_l(x, t_i = 1; \phi) & \text{otherwise} \end{cases}.$$

Examples of Determining the KL Term

As noted above, prior and approximating posterior distributions are not necessarily selected in isolation. Determining the KL term in certain acts described herein may depend on characteristics of both the prior and approximating posterior distributions, taken together. In particular, the KL term (sometimes referred to as the "KL divergence") may be decomposed into two terms:

$$KL[q_\phi(t \mid x, y) \parallel p_\phi(t)] =$$

$$-\sum_t q_\phi(t \mid x, y) \log p_\phi(t) + \sum_t q_\phi(t \mid x, y) \log q_\phi(t \mid x, y)$$

where the first sum is sometimes referred to as the "cross-entropy" term and the second sum is sometimes referred to as the "entropy" term. The entropy term depends only on the approximating posterior distribution $q_\phi(t|x, y)$ and so does not vary with the selection of the prior distribution. For example, the entropy of a factorial distribution can be calculated according to the following formula:

$$\text{Entropy}(q_\phi(t \mid x, y)) =$$

$$-\sum_l \mu_l(x, y; \phi) \log \mu_l(x, y; \phi) + (1 - \mu_l(x, y; \phi)) \log(1 - \mu_l(x, y; \phi)).$$

As another example, the entropy of an approximating posterior with a spike defined according to the formula given previously (with a delta distribution and a mixing term) is given by:

$$\text{Entropy}(q_\phi(t \mid x, y)) = \text{Entropy}(\alpha(x, y)) + \alpha(x, y)\text{Entropy}(q'_\phi(t \mid x, y)) -$$

$$\alpha(x, y)q'_\phi(t = 0 \mid x, y)softplus(-\text{logit}(\alpha(x, y)) - \log q'_\phi(t = 0 \mid x, y)) -$$

$$(1 - \alpha(x, y))softplus(\text{logit}(\alpha(x, y)) + \log q'_\phi(t = 0 \mid x, y))$$

where $$\text{logit}(u) = \log \frac{u}{1-u} \text{ and } softplus(u) = (1 + \exp(u)).$$

As a further example, the entropy of the example directed graphical model described above may be given by:

$$\text{Entropy}(q_\phi(t \mid x, y)) =$$

$$-\sum_{t_i} q_\phi(t_i \mid x) \log q_\phi(t_i \mid x) - \sum_{t_i} q_\phi(t_i \mid x) \sum_{j \neq i} q_\phi(t_j \mid x, t_i) \log q_\phi(t_j \mid x, t_i).$$

In the case of a Boltzmann prior distribution, the cross-entropy term may be decomposed into a number of unary and pairwise marginal distributions over the approximating posterior distribution as follows:

$$\text{Cross Entropy}(q_\phi(t \mid x, y) \parallel p_\theta(t)) =$$

$$\sum_l h_l q_\phi(t_l = 1 \mid x, y) + \sum_{k,l} J_{kl} q_\phi(t_k = 1, t_l = 1 \mid x, y) + \log Z_\theta$$

where the vector h and the matrix J represent respectively the diagonal and upper diagonal part of the matrix $\theta$ in a Boltzmann distribution. The value of $\log Z_\theta$ may be computed using annealed importance sampling and/or any other suitable sampling technique. In implementations where the objective function is optimized by gradient descent, the gradient of $\log Z_\theta$ may involve drawing M samples from $p_\theta(t)$ according to the following formula:

$$\frac{\partial}{\partial \theta_{ij}} \log Z_\theta \approx \frac{1}{M} \sum_{t^{(m)} \sim p_\theta(t)} -t_i^{(m)} t_j^{(m)}$$

where $t^{(m)}$ is the $m^{th}$ sample from $p_\theta(t)$.

The pairwise marginal distribution $q_\phi(t_k=1, t_l=1|x, y)$ depends on the selection of the approximating posterior distribution. The pairwise marginal distribution $q_\phi(t_k=1, t_l=1|x, y)$ for a factorial distribution may be expressed as follows:

$$q_\phi(t_k=1, t_l=1|x,y) = \mu_k(x,y;\phi)\mu_l(x,y;\phi).$$

The pairwise marginal distribution $q_\phi(t_k=1, t_l=1|x, y)$ for a distribution with a spike (if defined as described in the example given above) may be expressed as follows:

$$q_\phi(t_k=1, t_l=1|x,y) = \alpha(x,y)q'_\phi(t_k=1, t_l=1|x,y).$$

The pairwise marginal distribution $q_\phi(t_k=1, t_l=1|x, y)$ for a directed graphical model as defined above may be expressed as follows:

$$q_\phi(t_k = 1, t_l = 1 \mid x, y) =$$

$$\begin{cases} \mu_k(x; \phi)\mu_l(x, t_i = 1; \phi) & \text{if } k = i \\ \mu_l(x; \phi)\mu_k(x, t_i = 1; \phi) & \text{if } l = i \\ (1 - \mu_i(x; \phi))\mu_k(x, t_i = 0; \phi)\mu_l(x, t_i = 0; \phi) + \\ \mu_i(x; \phi)\mu_k(x, t_i = 1; \phi)\mu_l(x, t_i = 1; \phi) & \text{otherwise} \end{cases}.$$

In the case of a Boltzmann prior distribution with a spike as defined in an example above, the cross-entropy term may be decomposed into a number of unary and pairwise marginal distributions over the approximating posterior distribution as follows:

$$\text{Cross Entropy}(q_\phi(t \mid x, y) \parallel p_\theta(t)) = -\sum_t q_\theta(t \mid x, y) \log p_\theta(t) -$$

$$\log \alpha - q_\phi(t = 0 \mid x, y)softplus(\log Z_\theta - \text{logit}(\alpha))$$

where the first term (a summation) is the same as the cross-entropy term for the Boltzmann approximating posterior distribution.

Undirected Graphical Models for Label Noise

Figure 4A:
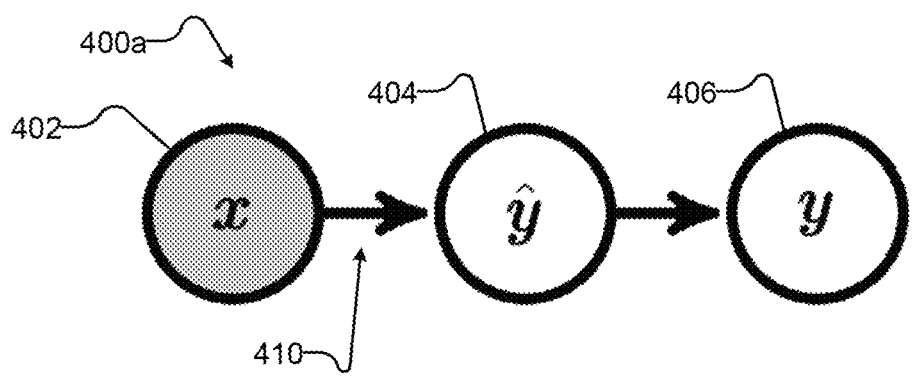
FIG. 4A is a schematic diagram via a directed graphical model according to a conventional approach employing directed edges.

In the example directed graphical model of FIG. 2, true labels ŷ are represented implicitly via the interaction between t and y. In some machine learning models, true labels ŷ are represented explicitly, for example as shown in FIG. 4A. Model 400a of FIG. 4A is illustrative of a typical approach, in which the conditional dependencies between variables 402(x), 406(y) and 404 (ŷ) are modelled via a directed graphical model (i.e. model 400a), i.e. a model with directed edges 410.

In the example of model 400a, true labels ŷ are assumed to be latent during training and, in the multiclass classification problem, may be easily marginalized by enumerating over all possible cases. However, certain challenges exist with such models. For instance, marginalizing true labels ŷ may be intractable (at least with existing methods) in the multi-label classification problem due to the numerous possible configurations of ŷ. As another example, the explaining away phenomenon can present obstacles to making accurate inferences over true labels ŷ.

Figure 4B:
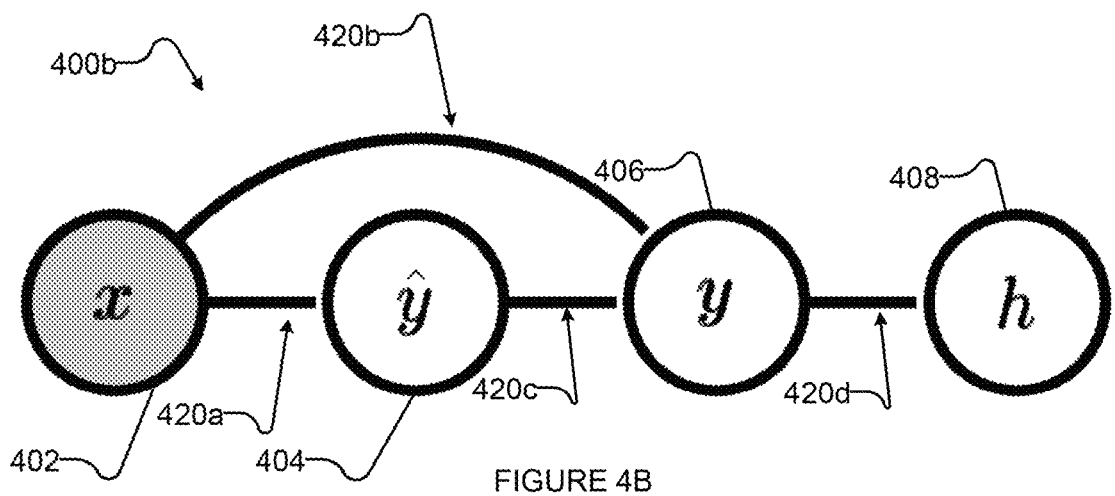
FIG. 4B is a schematic diagram of a undirected graphical model according to at least one of the approaches according to at least one aspect of the present disclosure.

In some implementations, the conditional dependencies between variables are modelled based on an undirected graph, such as in the example undirected graphical model 400b of FIG. 4B. Example model 400b may implement, for example, a conditional random field (CRF) model. In the example representation of model 400b, true labels ŷ and noisy labels y each conditionally depend on x, represented by edges 420a and 420b, respectively. Edge 420c links ŷ and y, thereby enabling model 400b to capture correlations between true labels ŷ and noisy labels y. Such correlations may help to infer latent true labels ŷ when only noisy labels y are observed.

In practice, noisy labels may be correlated, resulting in multimodal behavior of the joint probability distribution defined by the model. For example, an image (x) with the true label "cat" (ŷ) may tend to receive noisy labels (y) such as "kitten", "kitty" and "pet". Those noisy labels will then tend to be relatively highly correlated with the true "cat" label. However, there may be a weak form of exclusion between "kitten" and "kitty"—that is, a user who uses one such label may be less likely to use another noisy synonym, thereby reducing the probability of synonyms (and thus introducing multimodality). To model such potential multimodal behavior of y, hidden variables h (shown as variable 408) may optionally be introduced to model 400b. Edge 420d links noisy labels y to hidden variables h.

Undirected models are flexible and permit certain edges to be omitted while still retaining the ability to model noisy labels. In some implementations, edge 420b is omitted. In some implementations, edge 420c is omitted. In some implementations, variable 408 and its associated edges (e.g. edge 420d) are omitted.

The example CRF model 400b of FIG. 4B defines a joint probability distribution of y, ŷ, and h conditioned on x, denoted $p_\theta(y, ŷ, h|x)$. Various conditional distributions may be inferred from the joint distribution, such as $p_\theta(ŷ, h|y, x)$ or $p_\theta(h|y)$. The joint distribution uses an energy function $E_\theta(y, ŷ, h, x)$ that assigns an energy score to the configuration $(y, ŷ, h, x)$ and is parametrized by parameters $\theta$. The joint probability distribution may be defined using a Boltzmann (or Gibbs) distribution as follows:

$$p_\theta(y, ŷ, h | x) = \frac{1}{Z_\theta(x)} \exp(-E_\theta(y, ŷ, h, x))$$

where $Z_\theta(x)$ is the partition function (or normalizing coefficient), which may be defined by:

$$Z_\theta(x) = \sum_y \sum_{ŷ} \sum_h \exp(-E_\theta(y, ŷ, h, x))$$

and the energy function $E_\theta(y, ŷ, h, x)$ may be defined based on the following quadratic formulation:

$$E_\theta(y, ŷ, h, x) = -a^T ŷ - b^T y - c^T h - ŷ^T W y - h^T W' y$$

where a, b, and c are linear bias terms on ŷ, y, and h, respectively, and W and W' are pairwise interactions between ŷ and y and between y and h, respectively. Where edges are omitted from the model, the corresponding pairwise term may also be omitted from the energy function. (For example, omitting edge 420c in model 400b may result in the omission of pairwise term W from the energy function).

In some implementations, at least one of a, b, c, W, and W' are functions of the input x. For example, in some implementations, terms a and b are functions of x, whereas c and the pairwise interactions are constants, as shown below:

$$E_\theta(y, ŷ, h, x) = -a^T(x) ŷ - b^T(x) y - c^T h - ŷ^T W y - h^T W' y$$

In some implementations, terms which are functions of x are defined using a machine learning model parametrized by $\phi$. The machine learning model may be, for example, a neural network, such as a deep convolutional neural network (CNN) parametrized by $\phi$. In such implementations, parameters $\theta$ may encapsulate $\phi$ and any constant terms of $E_\theta$. For instance, in the example above (where a and b are functions of x), $\theta$ may be defined by $\theta = \{\phi, c, W, W'\}$; this formulation may capture all of the parameters of the CRF model (including the embedded CNN which defines a and b).

In implementations, it may be necessary to calculate further conditional distributions based on the joint distribution $p_\theta(y, ŷ, h|x)$. For example, in implementations where true labels ŷ are not observed over at least part of the dataset (such as semi-supervised implementations), it may be necessary to consider distributions over true labels ŷ conditioned on observed values (such as noisy labels y and data elements x). Such distributions may take the form of, for example, $p_\theta(ŷ|y, x)$ and/or $p_\theta(ŷ, h|y, x)$. In some implementations, conditional distribution $p_\theta(ŷ, h|y, x)$ takes a factorial distribution, which may be calculated analytically given $\theta$. For instance, it may be calculated based on:

$$p_\theta(ŷ, h | y, x) = \prod_i p_\theta(ŷ_i | y, x) \prod_j p_\theta(h_j | y)$$

where $p_\theta(ŷ_i 1|y, x) = \sigma(a_{(i)} + W_{(i,:)} y)$ and $p_\theta(h_j|y) = \sigma(c_{(j)} + W'_{(j,:)} y)$.

$$\sigma(u) = \frac{1}{(1 + \exp - u)}$$

is a sigmoid function and the subscripts (i) and (i,:) indicate the $i^{th}$ element or row in the corresponding vector or matrix, respectively. Other distributions (factorial or otherwise) may alternatively, or additionally, be used for such related conditional distributions. In implementations involving hidden variables h, distributions such as $p_θ(h|x, y)$ (which may be written as $p_θ(h|y)$ in implementations where h and x are independent, as in model 400b) may also, or alternatively, be determined by conditioning the joint distribution appropriately.

Training Undirected Graphical Models for Label Noise A First Approach

In some implementations, the parameters θ of model 400b are trained via a semi-supervised approach. A training set of data is annotated with noisy labels (y) and a subset of that training set is provided with "clean" (i.e. true) labels (ŷ). An objective function may be defined based on a combination of the marginal data likelihoods of the clean subset and the noisy set. A suitable method may then be used to learn the parameters of the model, such as the maximum likelihood method.

For example, if $D_N=\{(x^{(n)}, y^{(n)})\}$ and $D_C=\{(x^{(c)}, ŷ^{(c)}, y^{(c)})\}$ are disjoint sets representing the noisy-labelled and clean-labelled training data, respectively, then the parameters θ of model 400b may be trained by maximizing the marginal log likelihood, which may be defined as follows:

$$\max_θ \frac{1}{|D_N|}\sum_n \log p_θ(y^{(n)}|x^{(n)}) + \frac{1}{|D_C|}\sum_c \log p_θ(y^{(c)}, ŷ^{(c)}|x^{(c)})$$

where $p_θ(y^{(n)}|x^{(n)})=\sum_{ŷ,h} p_θ(y^{(n)}, ŷ, h|x^{(n)})$ and $p_θ(y^{(c)}, ŷ^{(c)}|x^{(c)})=\sum_h p_θ(y^{(c)}, ŷ^{(c)}, h|x^{(c)})$. Although the presence of hidden variables may pose obstacles to finding an analytically optimized solution, the parameters may be trained using variational inference or other suitable methods. Such methods may involve, for example, maximizing the variational lower bound (also known as the evidence lower bound, or ELBO), which may be formed by subtracting the Kullback-Leibler (KL) divergence between an approximating distribution q and the true joint distribution $p_θ$. For instance, the lower bound for the noisy training set's term in the marginal log likelihood (i.e. the first of the two terms in the above marginal log likelihood) may be given by:

$$\mathcal{U}_θ(x, y) = \log p_θ(y|x) - KL[q(ŷ, h | y, x) \| p_θ(ŷ, h | y, x)]$$
$$= \mathbb{E}_{q(ŷ,h|y,x)}[\log p_θ(y, ŷ, h | x)] -$$
$$\mathbb{E}_{q(ŷ,h|y,x)}[\log q(ŷ, h | y, x)]$$

where q denotes an approximating distribution. In implementations where joint distribution $p_θ$ is solvable analytically (e.g. as is the case in a undirected graphical model representing a factorial distribution), q may be set to be equal to $p_θ$, thereby avoiding a need to introduce an approximation. In some embodiments, q approximates $p_θ$, as described elsewhere herein.

In some implementations, parameters θ are trained using Expectation-Maximization (EM), which involves maximizing over the noisy set $D_N$ by iterating between two steps. In the E-step, θ is fixed and the lower bound $\mathcal{U}_θ(x, y)$ is maximized with respect to approximating distribution q(ŷ, h|y, x). In some implementations, this may be done by setting q(ŷ, h|y, x) to be equal to $p_θ(ŷ, h|y, x)$; this may be particularly convenient where $p_θ(ŷ, h|y, x)$ is analytic. In the M-step, q is fixed and the lower bound is maximized with respect to model parameters θ. This may be done, for example, by optimizing the $\mathbb{E}_{q(ŷ, h|y, x)}[\log p_θ(y, ŷ, h|x)]$ term using Markov Chain Monte Carlo estimation.

A lower bound $\mathcal{L}_θ(x, y, ŷ)$ may be defined for the clean training subset $D_C$ in a similar way, albeit modified to account for observed true labels ŷ. For example, lower bound $\mathcal{L}_θ(x, y, ŷ)$ may be given by:

$$\mathcal{L}_θ(x,y,ŷ)=\log p_θ(y,ŷ|x)-KL[q(h|y)\|p_θ(h|y)]$$

and may be maximized using similar and/or alternative methods to $\mathcal{U}_θ(x, y, ŷ)$.

The above semi-supervised approach infers the latent variables using the conditional distribution q(ŷ, h|y, x). However, at the beginning of training when the model parameters are not trained yet, sampling from conditional distribution q(ŷ, h|y, x) may have a relatively low rate of accuracy. This issue is compounded when training a model with strong representation power, such as a CRF model with an embedded CNN, as it may fit to poor conditional distributions early in the training process. In some implementations, this is mitigated by oversampling instances from the clean subset $D_C$ and/or weighting the clean log likelihood term $\mathcal{L}_θ(x, y, ŷ)$ more heavily than the noisy log likelihood term $\mathcal{U}_θ(x, y)$. Alternatively, or in addition, some implementations provide auxiliary sources of information which can be used to extract information about noisy and true labels early in the training process and/or at other times, for example as described in greater detail below.

Training Undirected Graphical Models for Label Noise Using Auxiliary Distributions In some implementations, an auxiliary distribution $p_{aux}$(y, ŷ, h) representing the joint probability of noisy and clean labels, along with some hidden variables h, is used to train parameters in a semi-supervised setting. It is not necessary for the auxiliary distribution to be conditional on input data x. In certain circumstances, such an auxiliary distribution may assist in guiding the model (e.g. model 400b) to infer true (but latent) labels more accurately than would be provided by the training approach provided in the previous section. The auxiliary distribution may optionally represent information drawn from an explicit auxiliary source of information, such as a knowledge graph and/or from an observed semantic relatedness of labels.

The model (e.g. model 400b) may be trained based on auxiliary distribution $p_{aux}$(y, ŷ, h) by, for example, adding a KL distance term to the evidence lower bound which penalizes the model for diverging from the conditional distribution resulting from the auxiliary distribution. Such a modified lower bound may be defined over the noisy set $D_N$ as follows:

$$\mathcal{U}_θ^{aux}(x,y)=\log p_θ(y|x)-KL[q(ŷ,h|y,x)\|p_θ(ŷ,h|y,x)]- αKL[q(ŷ,h|y,x)\|p_{aux}(ŷ,h|y)]$$

where α is an optional scaling term which may vary over the course of training. In some implementations, α is monotonically decreasing. Scaling term α is non-negative (in the above formulation, at least) and may decrease to 0 or remain greater than 0 throughout training. In some implementations, α is constant. In some implementations, α is not monotonically decreasing and may increase (continuously or non-continuously) during training. It will be appreciated that setting α=0 recovers the original lower bound (i.e. $\mathcal{U}_θ^{aux}$(x, y)=$\mathcal{U}_θ$(x, y)) and setting α→∞ causes the model to ignore the original lower bound and be dominated by the effects of the auxiliary distribution.

It may strike some as counterintuitive to introduce an additional term to the lower bound, as additional terms loosen the lower bound (which is generally something to be avoided, as tighter lower bounds are generally considered to provide more accurate results). There are a few observations which justify this action. The first is that adding such a term has been found experimentally by the inventor to improve training results. The second is that adding the additional term regularizes the lower bound—in effect, it provides a benefit (by providing additional information) which outweighs the costs of loosening the bound in at least some circumstances. The third is that, in the case of the noisy lower bound $\mathcal{U}_\theta^{aux}(x, y)$, the lower bound being loosened is that of the noisy labels (y), whereas in most circumstances an objective of the model is to predict true labels (ŷ), so loosening the lower bound does not necessarily reduce the inferential power of the model with respect to the variables of interest.

In some implementations, hidden variables h are omitted from the additional term—that is, a term of the form $\alpha KL[q(\hat{y}|y, x) \| p_{aux}(\hat{y}|y)]$ is added. In some implementations, an additional term based on the auxiliary distribution is also added to the lower bound defined over the clean set $D_C$, e.g. as follows:

$$\mathcal{L}_\theta^{aux}(x,y,\hat{y}) = \log p_\theta(y,\hat{y}|x) - KL[q(h|y) \| p_\theta(h|y)] - \alpha KL[q(h|y) \| p_{aux}(h|y)].$$

Figure 4C:
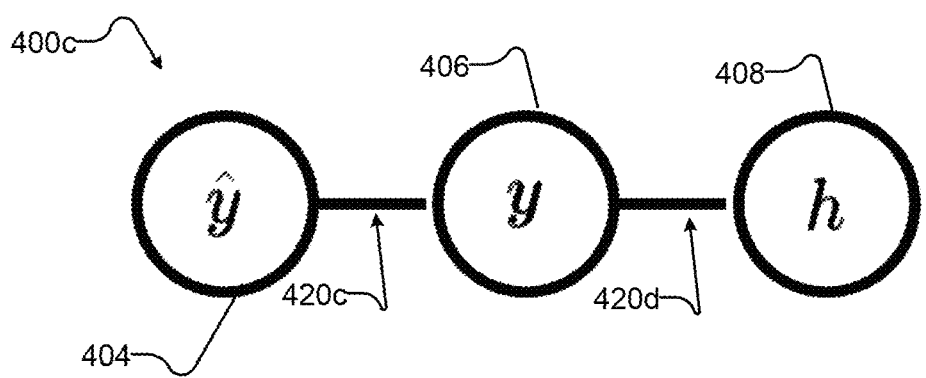
FIG. 4C is a schematic diagram of a undirected graphical model according to at least one of the approaches according to at least one aspect of the present disclosure.

Auxiliary distribution $p_{aux}(y, \hat{y}, h)$ may be modelled by an undirected graphical model, such as model 400c of FIG. 4C. In some implementations, auxiliary joint distribution may be modelled as a Restricted Boltzmann Machine (RBM), which may be similar to CRF model 400b (although example model 400c differs from model 400b at least in that it does not depend on x). Accordingly, auxiliary distribution $p_{aux}(y, \hat{y}, h)$ may be defined according to the following formula:

$$p_{aux}(y, \hat{y}, h) = \frac{1}{Z_{aux}} \exp(-E_{aux}(y, \hat{y}, h))$$

where $Z_{aux}$ is the partition function (or normalizing coefficient) defined as above but over the auxiliary energy function $E_{aux}$. The auxiliary energy function $E_{aux}$ may be defined based on the following quadratic formulation:

$$E_{aux}(y,\hat{y},h) = -a_{aux}^T \hat{y} - b_{aux}^T y - c_{aux}^T h - \hat{y}^T W_{aux} y - h^T W'_{aux} y$$

where the parameters of the auxiliary model (i.e. $a_{aux}$, $b_{aux}$, $c_{aux}$, $W_{aux}$, $W'_{aux}$, referred to herein as the "auxiliary parameters") are trained using a suitable training method, such as by maximizing the log likelihood of y and ŷ. For instance, the auxiliary parameters may be trained via persistent contrastive divergence (PCD) and/or stochastic gradient descent (SGD). The auxiliary parameters may be trained on at least part of the clean subset $D_C$ prior to training CRF mode 400b and may remain fixed during training of CRF model 400b.

Having defined the auxiliary distribution $p_{aux}$ based on a suitable model, such as model 400c, the primary inference model (e.g. model 400b) may be trained based at least in part on the auxiliary distribution. For example, training may involve searching for parameters θ which maximize a lower bound based on the auxiliary distribution (e.g. based on an energy function of the auxiliary distribution). For instance, parameters θ may be trained based on the following example objective function:

$$\max_\theta \frac{1}{|D_N|} \sum_n \mathcal{U}_\theta^{aux}(x^{(n)}, y^{(n)}) + \frac{1}{|D_C|} \sum_c \mathcal{L}_\theta^{aux}(x^{(c)}, y^{(c)}, \hat{y}^{(c)})$$

where $\mathcal{U}_\theta^{aux}(x^{(n)}, y^{(n)})$ and $\mathcal{L}_\theta^{aux}(x^{(c)}, y^{(c)}, \hat{y}^{(c)})$ are the modified lower bounds defined over the noisy and clean data sets, respectively, incorporating additional terms based on the auxiliary distribution as defined above. In some implementations, one of $\mathcal{U}_\theta^{aux}(x^{(n)}, y^{(n)})$ and $\mathcal{L}_\theta^{aux}(x^{(c)}, y^{(c)}, \hat{y}^{(c)})$ is replaced by the corresponding original lower bound (i.e. $\mathcal{U}_\theta(x^{(n)}, y^{(n)})$ or $\mathcal{L}_\theta(x^{(c)}, y^{(c)}, \hat{y}^{(c)})$ respectively). In some embodiments, original lower bounds $\mathcal{U}_\theta(x^{(n)}, y^{(n)})$ and $\mathcal{L}_\theta(x^{(c)}, y^{(c)}, \hat{y}^{(c)})$ are used without incorporating an additional term based on the auxiliary distribution and information from the auxiliary distribution is incorporated in the training of parameters θ independently of those terms (e.g. by adding an additional term to the objective function).

Parameters θ may be trained via any suitable method. In some implementations, parameters θ are trained based on Expectation-Maximization (EM), which involves alternating between an E-step and an M-step (e.g. as described above).

In at least some implementations, the E-step involves optimizing an objective function with respect to the approximating distribution q(ŷ, h|y, x) for fixed parameters θ. For example, modified noisy lower bound $\mathcal{U}_\theta^{aux}(x^{(n)}, y^{(n)})$ may be optimized by solving the following example lower bound optimization function:

$$\min_q KL[q(\hat{y}, h | y, x) \| p_\theta(\hat{y}, h | y, x)] + \alpha KL[q(\hat{y}, h | y, x) \| p_{aux}(\hat{y}, h | y)]$$

which is minimized when the approximating distribution is proportional to an α-weighted geometric mean of the true posterior distribution $p_\theta(\hat{y}, h|y, x)$ and the auxiliary distribution $p_{aux}(\hat{y}, h|y, x)$. In particular, the above example lower bound optimization function is minimized when:

$$q(\hat{y}, h | y, x) \propto [p_\theta(\hat{y}, h | y, x) p_{aux}^\alpha(\hat{y}, h | y)]^{\frac{1}{\alpha+1}}.$$

In implementations where $p_\theta(\hat{y}, h|y, x)$ and $p_{aux}(\hat{y}, h|y)$ are factorial, the approximating distribution q(ŷ, h|y, x) will also be factorial. For instance, particular values of q may be determinable based on the following formulae:

$$q(\hat{y}_i = 1 | y, x) = \sigma\left(\frac{1}{\alpha+1}\left(\begin{array}{c} a_{(i)} + W_{(i,:)}y + \alpha a_{aux(i)} + \\ \alpha W_{aux(i,:)}y \end{array}\right)\right)$$

$$q(h_j = 1 | y) = \sigma\left(\frac{1}{\alpha+1}\left(\begin{array}{c} c_{(j)} + W'_{(j,:)}y + \alpha c_{aux(j)} + \\ \alpha W'_{aux(j,:)}y \end{array}\right)\right)$$

where a, c, W and W' are linear and pairwise terms based on the energy function $E_\theta$ of the joint distribution $p_\theta$, as described above, and $a_{aux}$, $c_{aux}$, $W_{aux}$ and $W'_{aux}$ are similarly-defined terms based on the energy function $E_{aux}$ of the auxiliary distribution $p_{aux}$.

Similarly, the modified clean lower bound $\mathcal{L}_\theta^{aux}(x, y, \hat{y})$ may be optimized with respect to q(h|y) when:

$$q(h | y) \propto [p_\theta(h | y) p_\theta^{aux}(h | y)]^{\frac{1}{\alpha+1}}.$$

In at least some implementations, the M-step involves optimizing the objective function with respect to θ while q is fixed. In some implementations, the problem of optimizing the objective function is recast as maximizing an expectation of a log-likelihood of the joint distribution, which may be expressed as follows:

$$\max_\theta \mathbb{E}_{q(\hat{y}, h|x, y)}[\log p_\theta(y, \hat{y}, h \mid x)].$$

This may be done by any suitable optimization technique. In some implementations, the expectation is maximized using a gradient ascent-based technique, which may involve determining gradients across one or both of the modified noisy and clean lower bounds $\mathcal{L}_\theta^{aux}$ and $\mathcal{L}_\theta^{aux}$ (and/or their corresponding original lower bounds, as applicable). These gradients may be determined by determining gradients across each of the noisy and clean lower bounds with respect to θ, which in some implementations may be determined as follows:

$$\frac{\partial}{\partial \theta} \mathcal{U}_\theta^{aux}(x, y) = \frac{\partial}{\partial \theta} \mathbb{E}_{q(\hat{y}, h|x, y)}[\log p_\theta(y, \hat{y}, h \mid x)]$$
$$= \mathbb{E}_{q(\hat{y}, h|x, y)}\left[\frac{\partial}{\partial \theta} - E_\theta(y, \hat{y}, h, x)\right] - \mathbb{E}_{p(y, \hat{y}, h|x)}$$
$$\left[\frac{\partial}{\partial \theta} - E_\theta(y, \hat{y}, h, x)\right]$$

$$\frac{\partial}{\partial \theta} \mathcal{L}_\theta^{aux}(x, y, \hat{y}) = \frac{\partial}{\partial \theta} \mathbb{E}_{q(h|y)}[\log p_\theta(y, \hat{y}, h \mid x)]$$
$$= \mathbb{E}_{q(h|y)}\left[\frac{\partial}{\partial \theta} - E_\theta(y, \hat{y}, h, x)\right] - \mathbb{E}_{p(y, \hat{y}, h|x)}$$
$$\left[\frac{\partial}{\partial \theta} - E_\theta(y, \hat{y}, h, x)\right]$$

where, for each of the above gradients, the first of the summed expectations may be referred to as the "positive phase" and is defined over the approximating distribution q and the second of the summed expectations may be referred to as the "negative phase" and is defined over the joint distribution $p_\theta$. In some implementations, such as the above example, the negative phases of the noisy and clean gradients are identical, whereas the positive phases differ in that for the clean gradient the true label ŷ is given for each instance so the sampling may only need to be done over the remaining hidden variables (e.g. over h conditioned on y).

The positive phase for each gradient may be determined analytically, by estimation, or by any other suitable technique. In some implementations, the expectation over the joint distribution (i.e. the negative phase) is not determinable analytically and may be determined via estimation, belief propagation, sampling, and/or other non-analytical techniques (referred to generally in the claims appended hereto as determination by approximation). For example, the negative phase may be determined based on Markov Chain Monte Carlo and/or persistent constrastive divergence. (Where PCD is used, a set of particles may be maintained for each training instance and used to seed Markov chains at each iteration of training).

The scaling factor α may be any suitable value during training. For example, α may be a constant value (e.g. provided by a user and/or determined experimentally or analytically). In some implementations, α is initially set to a large value (e.g. values on the order of 10-100 have been found to work well in some experiments, although α is not limited to such values in this disclosure or in the appended claims) and is decreased over the course of training to smaller values. Scaling factor α may reduce to 0 or may remain greater than 0 throughout training. A motivation for this shift in values is that $p_\theta(\hat{y}, h|y, x)$ may not be able to accurately predict true labels early in training, but may improve later in training, so the training process may rely more on $p_{aux}(\hat{y}, h|y)$ early in training and less later in training. Accordingly, scaling factor α may be set approximately inversely proportionately to an expected accuracy of $p_\theta(\hat{y}, h|y, x)$ at a given point in training.

Once trained, the trained model may generate predictions of true labels ŷ by determining the value of marginal distribution $p_\theta(\hat{y}|x)$ for some input data x. In some implementations, this is done by performing Gibbs sampling over the joint distribution $p_\theta(y, \hat{y}, h|x)$ to determine the marginal distribution.

It will be appreciated that particular aspects of the foregoing methods may be implemented by a computing system in various ways. In at least one example method, a CRF model with an embedded CNN is trained by gradient descent based on a noisy dataset $D_N$, a clean dataset $D_C$, a previously-trained auxiliary distribution $p_{aux}(y, \hat{y}, h)$, a learning parameter ∈ and a scaling schedule α (which may vary over the course of training, as described above). The method returns model parameters θ={ϕ, a, b, c, W, W'} (although note that terms which are defined by ϕ may not be explicitly represented by θ). An example pseudocode representation of such a method is shown below:

```
while Stopping criteria is not met do
|   foreach minibatch {(x⁽ⁿ⁾, y⁽ⁿ⁾), (x⁽ᶜ⁾, ŷ⁽ᶜ⁾, y⁽ᶜ⁾)} = getMinibatch(D_N, D_C) do
|       |Compute q(ŷ, h|y⁽ⁿ⁾, x⁽ⁿ⁾) for each noisy instance
|       |Compute q(h|y⁽ᶜ⁾) for each clean instance
|       |Do Gibbs sweeps to sample from the current p_θ(y, ŷ, h|x⁽·⁾) for each clean/noisy instance
|       |(m_n, m_c) ← (# noisy instances in minibatch, # clean instances in minibatch)
|
|       |  θ ← θ + ε(1/m_n ∑_n ∂/∂θ U_θ^aux(x⁽ⁿ⁾, y⁽ⁿ⁾)) + 1/m_c ∑_c ∂/∂θ L_θ^aux(x⁽ᶜ⁾, y⁽ᶜ⁾, ŷ⁽ᶜ⁾)
|
|   end
end
```

Figure 5:
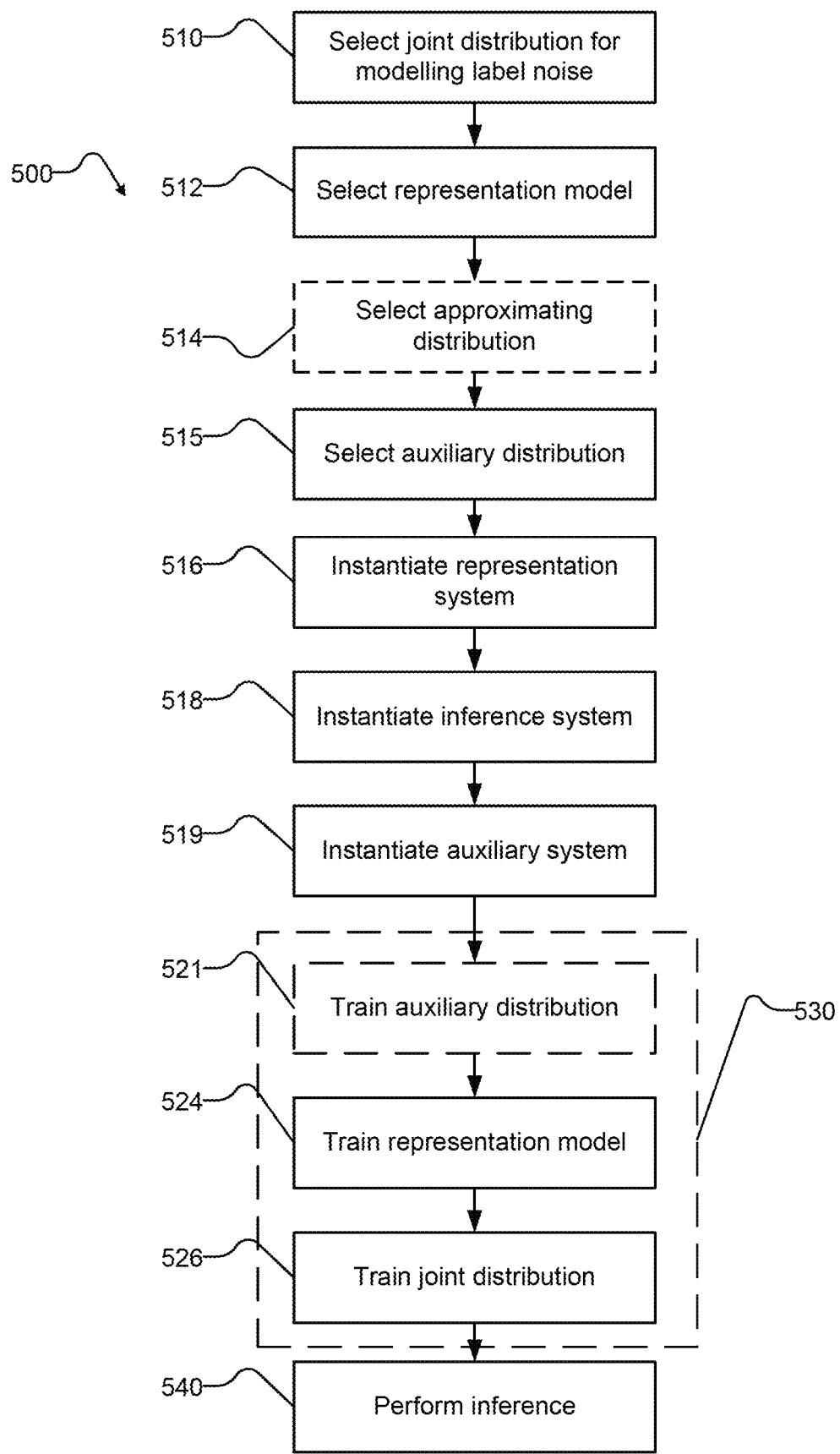
FIG. 5 is a flowchart illustrating an example method for instantiating an example machine learning system according to an aspect of the present disclosure.

FIG. 5 shows an example method 500 for instantiating an example machine learning system according to an aspect of the present disclosure. At 510, a joint distribution $p_\theta$ for modelling label noise is selected—for example, based on the undirected graphical model 400b of FIG. 4B.

At 512, a representation model is selected. The representation model may be represented by $p_\theta(\hat{y}|x)$ and may be selected in any of the ways described above with respect to act 112. For example, the representation model may comprise a CNN modelling various linear and pairwise terms, as described above.

At 514, an approximating distribution is optionally selected. As described above, in some implementations a conditional distribution based on the joint distribution may be used in place of the approximation distribution (or, stated equivalently, the approximating distribution q may be set to be equal to its corresponding analytic distribution $p_\theta$, so that no approximating is introduced by q).

At 515, an auxiliary distribution is selected. Note that the order of the depicted acts may be varied, so that the auxiliary distribution may be selected, instantiated via its corresponding system (at 519) and/or trained (at 521) prior to the selection, instantiation, and/or training of other models, distributions, and systems (such as the joint distribution and representation model).

One or more of the selections at 510, 512, 514, and 515 may be made by a user and provided to a computing system. Alternatively, or in addition, one or more of the selections at 510, 512, 514, and 515 may be made by the computing system, e.g. in response to identifying a characteristic of a problem, in response to an instruction, and/or by predetermination (e.g. the computing system may only be provided with one option to select from).

At 516, 518, and 519, the representation model, joint distribution, and auxiliary distribution are instantiated by a computing system as a representation system, an inference system, and an auxiliary system, respectively. Instantiation may comprise representing the relevant models and distributions with logical structures in a memory of the computing system. The instantiated systems direct the operation of one or more processors of the computing system. For example, the instantiated systems may comprise deep neural networks which are operable to take the inputs required by the model (or distribution) and to generate outputs which correspond to the outputs of the model (or distribution). Examples of instantiations of acts 518 and 519 are discussed in greater detail above with reference to FIGS. 4B and 4C.

At 530, the machine learning system is trained based on the selected distributions and their associated systems. The auxiliary distribution, joint distribution, and representation model may be trained separately or together. Their training acts are shown as 521, 524, and 526, respectively. In some implementations, the auxiliary distribution is fixed during training of the representation model and joint distribution; it may be trained prior to the training of the machine learning system, may be pre-determined, and/or may be fixed during training of the machine learning system. Accordingly, 521 (corresponding to the training of the auxiliary distribution) is shown as optional by rendering it in dashed lines in FIG. 1. In some implementations, the representation model and joint distribution are trained together.

At 540, the trained machine learning system performs inference based on the trained joint distribution. In particular, the inference system proposes (infers) a set of true labels ŷ for a given input x based on the conditional distribution $p_\theta(\hat{y}|x)$. This may comprise marginalizing other variables (such as y and h), which the computer system may do via, for example, Gibbs sampling or any other suitable marginalization technique.

The above described method(s), process(es), or technique(s) could be implemented by a series of processor readable instructions stored on one or more nontransitory processor-readable media. Where one computing system is described, it will be understood that such computing systems may comprise a plurality of processors (e.g. in communication via a network). The above described method(s), process(es), or technique(s) may include various acts, though those of skill in the art will appreciate that in alternative examples certain acts may be omitted and/or additional acts may be added. Those of skill in the art will appreciate that the illustrated order of the acts is shown for exemplary purposes only and may change in alternative examples. Some of the exemplary acts or operations of the above described method(s), process(es), or technique(s) are performed iteratively. Some acts of the above described method(s), process(es), or technique(s) can be performed during each iteration, after a plurality of iterations, or at the end of all the iterations.

The above description of illustrated implementations, including what is described in the Abstract, is not intended to be exhaustive or to limit the implementations to the precise forms disclosed. Although specific implementations of and examples are described herein for illustrative purposes, various equivalent modifications can be made without departing from the spirit and scope of the disclosure, as will be recognized by those skilled in the relevant art. The teachings provided herein of the various implementations can be applied to other methods of quantum computation, not necessarily the exemplary methods for quantum computation generally described above.

The various implementations described above can be combined to provide further implementations. All of the commonly assigned US patent application publications, US patent applications, foreign patents, and foreign patent applications referred to in this specification and/or listed in the Application Data Sheet are incorporated herein by reference, in their entirety, including but not limited to:

U.S. Patent Application No. 62/322,116;
U.S. Patent Application No. 62/404,591;
U.S. Patent Application No. 62/427,020;
U.S. Patent Application No. 62/508,343;
U.S. Patent Publication No. US2016/047,627;
U.S. patent application Ser. No. 62/427,020;
U.S. Patent Application Ser. No. 15/452,438;
U.S. Patent Publication No. US2016/047,628;
International patent application PCT/US2016/047,628, published as WO 2017/031,357; and
International patent application PCT/US2017/015,401, filed Jan. 27, 2017.

These and other changes can be made to the implementations in light of the above-detailed description. In general, in the following claims, the terms used should not be construed to limit the claims to the specific implementations disclosed in the specification and the claims, but should be construed to include all possible implementations along with the full scope of equivalents to which such claims are entitled. Accordingly, the claims are not limited by the disclosure.

The invention claimed is:

1. A method for instantiating a machine learning system for classifying one or more observed elements of an input dataset, the input dataset labelled with one or more observed labels drawn from a plurality of binary labels, the method executed by at least one processor in communication with at least one memory and comprising:

instantiating a recognition system in the at least one memory, the recognition system operable to classify elements of the input dataset by generating a classification probability for the at least one observed element;
generating a prior distribution, the prior distribution modelling label noise as a set of stochastic label flips on the plurality of binary labels, each label flip indicating a belief in the correctness of a corresponding label;

instantiating an approximating posterior system in the at least one memory, the approximating posterior system being a deep neural network operable to generate a posterior probability for one or more label flips for the observed element given the one or more observed labels;

modeling an approximating posterior distribution using the approximating posterior system, the approximating posterior distribution approximating a true posterior distribution corresponding to the prior distribution, wherein at least one of the prior and posterior distribution comprises a spike, the spike defining a high-probability state where no labels are flipped; and training at least one of the recognition system and the approximating posterior system based on a training dataset, the prior distribution, and the approximating posterior distribution.

2. The method of claim 1 wherein the method further comprises instantiating a shared transformation system in the at least one memory, the shared transformation system operable to receive the one or more observed elements and to generate a representation of the observed elements based on one or more shared parameters, wherein the recognition system and the approximating posterior system are operable to receive the representation of the observed elements as input.

3. The method of claim 2 wherein training at least one of the recognition system and the approximating posterior system comprises training the shared transformation system to generate the one or more shared parameters.

4. The method of claim 1 further comprising selecting the prior distribution, and selecting the approximating posterior distribution, wherein at least one of selecting the prior distribution, and selecting the approximating posterior distribution comprises selecting a predetermined distribution.

5. The method of claim 1 wherein the approximating posterior distribution comprises a directed graphical model, the directed graphical model operable to generate, given an initial class, a probability of label change for each of one or more remaining classes.

6. The method of claim 1 wherein the method further comprises selecting one of the prior distribution and the approximating posterior distribution based on a previous selection of the other one of the prior distribution and the approximating posterior distribution.

7. The method of claim 6 wherein the prior distribution comprises a Boltzmann distribution with a spike and the approximating posterior distribution comprises a factorial distribution with a spike.

8. A method for training a machine learning system for classifying one or more observed elements of an input dataset, the input dataset labelled with one or more observed labels, the method executed by at least one processor in communication with at least one memory and comprising:

instantiating an inference system in the at least one memory;

modelling a joint probability distribution over a plurality of variables using the inference system, the plurality of variables comprising the observed labels and one or more true labels, the joint probability distribution conditional on the input dataset;

instantiating an auxiliary system in the at least one memory;

modelling an auxiliary probability distribution over the plurality of variables independently of the input dataset using the auxiliary system;

instantiating a representation system in the at least one memory, the representation system operable to characterize the one or more interactions between the plurality of variables of the joint distribution;

training at least one of the representation system and the inference system based on a first modified lower bound defined over at least a noisy subset of the input dataset, the noisy subset comprising input data and associated observed labels, the first modified lower bound comprising an original lower bound based on the joint probability distribution and an additional term based on the auxiliary probability distribution.

9. The method of claim 8 wherein training at least one of the representation system and the inference system comprises training at least one of the representation system and the inference system based on a modified clean lower bound defined over a clean subset of the input dataset, the clean subset disjoint from the noisy subset and comprising input data, associated observed labels, and associated true labels, the modified clean lower bound based at least in part on the auxiliary probability distribution.

10. The method of claim 8 wherein training at least one of the representation system and the inference system comprises determining a gradient over the additional term and training at least one of the representation system and the inference system based on the gradient.

11. The method of claim 10 wherein determining the gradient over the additional term comprises determining a first gradient over a positive phase of the additional term and a second gradient over a negative phase of the additional term, the first gradient determined analytically and the second gradient determined by approximation.

12. The method of claim 11 wherein training at least one of the representation system and the inference system comprises optimization of an objective function by expectation maximization.

13. The method of claim 8 wherein the auxiliary probability distribution is fixed while training at least one of the representation system and the inference system.

14. The method of claim 13 comprising training the auxiliary probability distribution based on information independent of the training dataset prior to training at least one of the representation system and the inference system.

15. The method of claim 8 wherein training at least one of the representation system and the inference system comprises training at least one of the representation system and the inference system based on an optimization function comprising a first term based on the joint probability distribution and independent of the auxiliary probability distribution and based on a second term based on the auxiliary probability distribution, wherein at least one of the first and second terms is scaled by a scaling factor.

16. The method of claim 15 comprising setting the scaling factor to a first value for a first iteration of training and setting the scaling factor to a second value for a second iteration of training.

17. The method of claim 16 wherein the scaling factor is monotonically decreasing during training.

18. The method of claim 8 wherein the inference system models the joint probability distribution based on an undirected graphical model, the undirected graphical model comprising one or more undirected edges representing one or more interactions between the plurality of variables of the joint distribution.

19. The method of claim 18 wherein the inference system models the auxiliary probability distribution based on an auxiliary undirected graphical model, the auxiliary undirected graphical model comprising an undirected subgraph of the undirected graphical model of the inference system.

* * * * *